United States Patent
Han et al.

(10) Patent No.: US 12,189,894 B2
(45) Date of Patent: Jan. 7, 2025

(54) ELECTRONIC DEVICE

(71) Applicant: Samsung Display Co., Ltd., Yongin-Si (KR)

(72) Inventors: Hyeyun Han, Yongin-si (KR); Eunyoung Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/396,992

(22) Filed: Dec. 27, 2023

(65) Prior Publication Data

US 2024/0220051 A1 Jul. 4, 2024

(30) Foreign Application Priority Data

Jan. 3, 2023 (KR) .................. 10-2023-0000515

(51) Int. Cl.
*G06F 3/00* (2006.01)
*G06F 3/041* (2006.01)
*G06F 3/044* (2006.01)

(52) U.S. Cl.
CPC .......... *G06F 3/0418* (2013.01); *G06F 3/0445* (2019.05); *G06F 3/0448* (2019.05); *G06F 2203/04107* (2013.01); *G06F 2203/04111* (2013.01)

(58) Field of Classification Search
CPC . G06F 2203/04107; G06F 2203/04111; G06F 2203/04112; G06F 3/0412; G06F 3/04164; G06F 3/0418; G06F 3/0443; G06F 3/0445; G06F 3/0446; G06F 3/0448
See application file for complete search history.

(56) References Cited

U.S. PATENT DOCUMENTS

| 10,606,424 | B2 | 3/2020 | Hara |
| 10,705,668 | B2 | 7/2020 | Li |
| 11,334,207 | B2 | 5/2022 | Kim et al. |
| 11,385,751 | B2 | 7/2022 | Bang et al. |

(Continued)

FOREIGN PATENT DOCUMENTS

| KR | 10-1628466 | 6/2016 |
| KR | 10-2021-0029862 | 3/2021 |

(Continued)

*Primary Examiner* — Insa Sadio
(74) *Attorney, Agent, or Firm* — F. CHAU & ASSOCIATES, LLC

(57) ABSTRACT

An electronic device including: a display layer including a display region and a peripheral region adjacent to the display region; and a sensor layer disposed on the display layer, wherein the sensor layer includes: a plurality of first electrodes arranged in a first direction; a plurality of second electrodes arranged in a second direction crossing the first direction and crossing the plurality of first electrodes; a plurality of first trace lines connected with the plurality of first electrodes, respectively; and a plurality of second trace lines connected with the plurality of second electrodes, respectively, wherein the first electrodes and the first trace lines are connected through a plurality of first contacts, respectively, and the second electrodes and the second trace lines are connected through a plurality of second contacts, respectively, and wherein the plurality of first contacts and the plurality of second contacts overlap the display region.

27 Claims, 16 Drawing Sheets

(56) References Cited

U.S. PATENT DOCUMENTS

| | | |
|---|---|---|
| 11,416,091 B2 | 8/2022 | Lee et al. |
| 11,460,966 B2 | 10/2022 | Kim et al. |
| 11,500,501 B2 | 11/2022 | Lee et al. |
| 11,507,233 B2 | 11/2022 | Gwon et al. |
| 11,543,924 B2 | 1/2023 | Park |
| 2018/0039364 A1* | 2/2018 | Pan .................. H01L 24/16 |
| 2019/0042047 A1* | 2/2019 | Liao ................... G09G 3/3648 |
| 2021/0271367 A1 | 9/2021 | Park et al. |

FOREIGN PATENT DOCUMENTS

| | | |
|---|---|---|
| KR | 10-2021-0086143 | 7/2021 |
| KR | 10-2022-0016360 | 2/2022 |

* cited by examiner

ELECTRONIC DEVICE

CROSS-REFERENCE TO RELATED APPLICATION

This application claims priority under 35 U.S.C. § 119 to Korean Patent Application No. 10-2023-0000515 filed on Jan. 3, 2023, in the Korean Intellectual Property Office, the disclosure of which is incorporated by reference herein in its entirety.

TECHNICAL FIELD

Embodiments of the present disclosure described herein relate to an electronic device in which the area of a peripheral region is reduced.

DISCUSSION OF RELATED ART

Multimedia electronic devices, including televisions, mobile phones, tablet computers, car navigation units, game machines, vehicle displays, and more, not only display images but also offer touch-based input methods. These touch-based input methods allow users to input information or commands in a straightforward manner, in addition to traditional input methods such as buttons, keyboards, and mice.

SUMMARY

Embodiments of the present disclosure provide an electronic device in which the area of a peripheral region is reduced.

According to an embodiment of the present disclosure, there is provided an electronic device including: a display layer including a display region in which an image is displayed and a peripheral region adjacent to the display region; and a sensor layer disposed on the display layer, wherein the sensor layer includes: a plurality of first electrodes arranged in a first direction; a plurality of second electrodes arranged in a second direction crossing the first direction and crossing the plurality of first electrodes; a plurality of first trace lines electrically connected with the plurality of first electrodes, respectively; and a plurality of second trace lines electrically connected with the plurality of second electrodes, respectively, wherein the plurality of first electrodes and the plurality of first trace lines are connected through a plurality of first contacts, respectively, and the plurality of second electrodes and the plurality of second trace lines are connected through a plurality of second contacts, respectively, and wherein the plurality of first contacts and the plurality of second contacts overlap the display region.

Each of the plurality of first trace lines includes a first portion extending parallel to the first direction and a second portion extending from the first portion in parallel with the second direction, and the first portion overlaps the display region.

The second portion includes a first sub-portion overlapping the display region and a second sub-portion overlapping the peripheral region.

The second sub-portion includes a first sub-conductive layer disposed on the same layer as the first sub-portion and a second sub-conductive layer disposed on a layer different from the first sub-conductive layer and electrically connected with the first sub-conductive layer.

The second sub-portion has a shape different from shapes of the first portion and the first sub-portion.

The second sub-portion has a width different from a width of the first sub-portion.

The plurality of first electrodes or the plurality of second electrodes include a plurality of sensing patterns and a plurality of bridge patterns disposed on a layer different from the plurality of sensing patterns and electrically connected to the plurality of sensing patterns.

All of the first portion is disposed on the same layer as the plurality of sensing patterns.

The first portion includes a first layer portion disposed on the same layer as the plurality of bridge patterns and a second layer portion disposed on the same layer as the plurality of sensing patterns.

The second layer portion crosses at least one second trace line among the plurality of second trace lines.

Each of the plurality of second trace lines includes a first portion extending parallel to the second direction, a second portion extending from the first portion in parallel with the first direction, and a third portion extending from the second portion in parallel with the second direction, and the first portion and the second portion overlap the display region.

The plurality of first electrodes or the plurality of second electrodes include a plurality of sensing patterns and a plurality of bridge patterns disposed on a layer different from the plurality of sensing patterns and electrically connected to the plurality of sensing patterns, and the first portion and the second portion are disposed on the same layer as the plurality of bridge patterns.

The first portion does not overlap the plurality of first electrodes.

Portions of the plurality of first trace lines and the plurality of second trace lines that overlap the peripheral region include a straight line extending in the second direction.

The sensor layer further includes a plurality of dummy patterns disposed on the same layer as the plurality of second trace lines in an area overlapping the display region.

The plurality of dummy patterns are electrically floated or electrically grounded.

Portions of the plurality of first trace lines overlap the display region and do not overlap the plurality of first electrodes and the plurality of second electrodes.

Portions of the plurality of first trace lines overlap the display region and overlap at least some of the plurality of first electrodes and the plurality of second electrodes.

According to an embodiment of the present disclosure, there is provided an electronic device including: a display layer including a display region configured to display an image and a peripheral region adjacent to the display region; and a sensor layer disposed on the display layer, wherein the sensor layer includes: a first electrode; a second electrode configured to cross the first electrode; a first trace line electrically connected with the first electrode; and a second trace line electrically connected with the second electrode, wherein the first trace line includes a (1-1)th portion extending parallel to a first direction and a (1-2)th portion extending from the (1-1)th portion in parallel with a second direction crossing the first direction, wherein the second trace line includes a (2-1)th portion extending parallel to the second direction, a (2-2)th portion extending from the (2-1)th portion in parallel with the first direction, and a (2-3)th portion extending from the (2-2)th portion in parallel with the second direction, and wherein the (1-1)th portion, a portion of the (1-2)th portion, the (2-1)th portion, the (2-2)th portion, and a portion of the (2-3)th portion overlap the display region.

The sensor layer further includes a plurality of dummy patterns disposed on the same layer as the (2-1)th portion, and the plurality of dummy patterns are electrically floated or electrically grounded.

Each of the (1-2)th portion and the (2-3)th portion includes a first sub-portion overlapping the display region and a second sub-portion overlapping the peripheral region, and the first sub-portion and the second sub-portion have different shapes.

An entirety of the (1-1)th portion is disposed on a layer different from the (2-1)th portion.

The (1-1)th portion includes a first layer portion disposed on the same layer as the (2-1)th portion and a second layer portion disposed on a layer different from the (2-1)th portion, and the second layer portion overlaps the (2-1)th portion.

According to an embodiment of the present disclosure, there is provided an electronic device including: a display layer including a display region and a peripheral region adjacent to the display region; and a sensor layer disposed on the display layer, wherein the sensor layer includes: a plurality of first electrodes arranged in a first direction; a plurality of second electrodes arranged in a second direction crossing the first direction; a plurality of first trace lines electrically connected with the plurality of first electrodes, respectively, in the display region; and a plurality of second trace lines electrically connected with the plurality of second electrodes, respectively, in the display region, and wherein a connecting portion of each of the plurality of first trace lines and the plurality of second trace lines extends in the first direction and overlaps the display region.

Each of the plurality of first trace lines and the plurality of second trace lines further includes an extending portion extending from the connecting portion toward the peripheral region, and wherein each of the plurality of second trace lines further includes a contact extending portion extending from the connecting portion in a direction away from the peripheral region.

The sensor layer further includes a plurality of dummy patterns disposed on the same layer as the contact extending portion, and the plurality of dummy patterns are electrically floated or electrically grounded.

The connecting portion of each of the plurality of first trace lines does not overlap the plurality of first electrodes and the plurality of second electrodes.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

Figure 1:
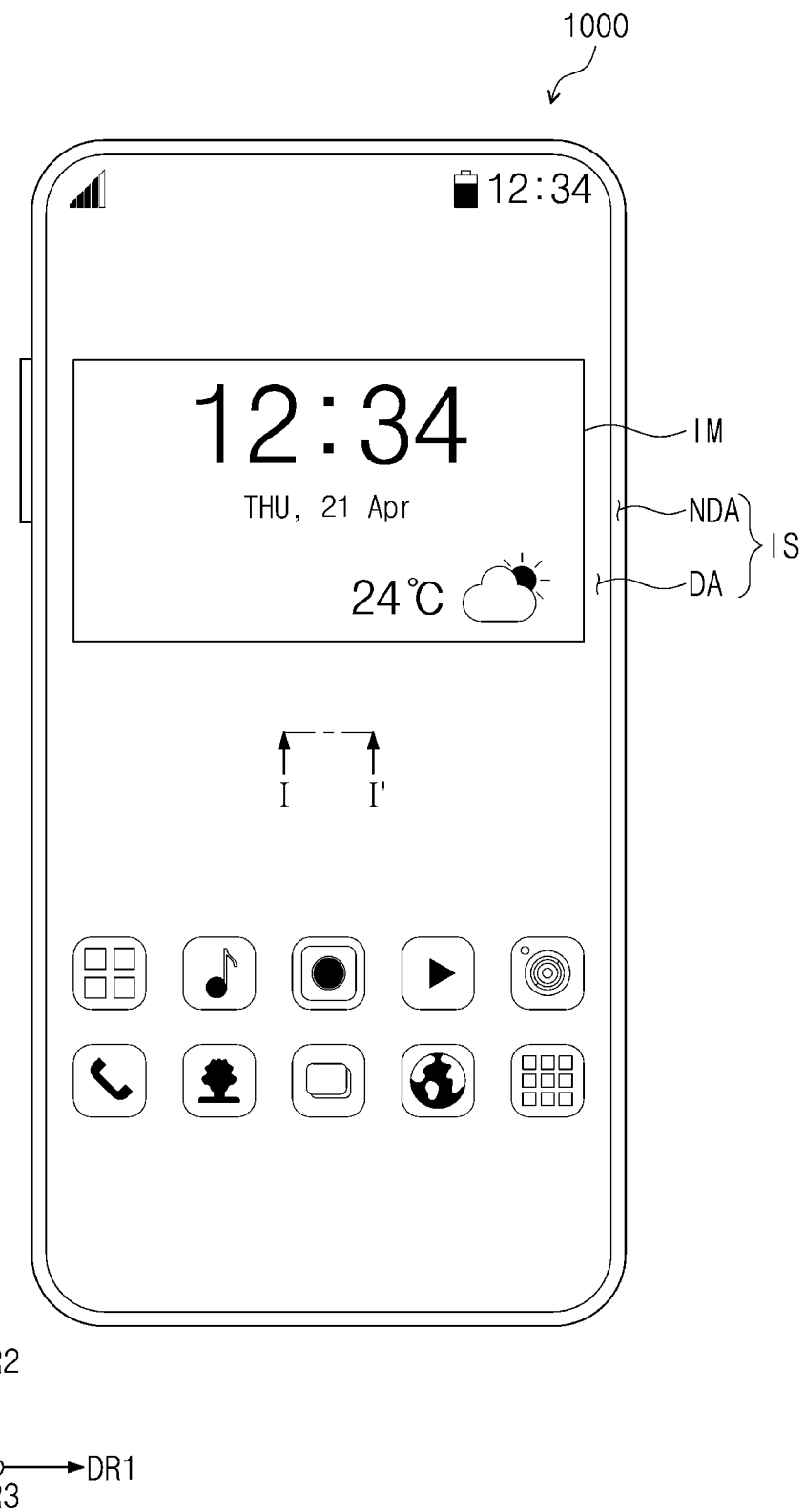
FIG. 1 is a plan view of an electronic device according to an embodiment of the present disclosure.

In this specification, when a component (or, a region, a layer, a part, etc.) is referred to as being "on", "connected to" or "coupled to" another component, this may mean that the component is directly on, connected to, or coupled to the other component or that a third component is present therebetween.

Identical reference numerals refer to identical components throughout the specification. Additionally, in the drawings, the thicknesses, proportions, and dimensions of components may be exaggerated. As used herein, the term "and/or" includes one or more combinations of the associated components.

Terms such as first, second, and the like may be used to describe various components, but the components should not be limited by the terms. The terms may be used to distinguish one component from another component. For example, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. These terms are relative concepts and are described based on directions illustrated in the drawings.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by persons skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

FIG. 1 is a plan view of an electronic device 1000 according to an embodiment of the present disclosure.

Referring to FIG. 1, the electronic device 1000 may be a device activated in response to an electrical signal. In other words, the electronic device 1000 may be an electrical signal-activated device. The electronic device 1000 may be applied to an electronic device such as a mobile phone, a tablet computer, a smart watch, a notebook computer, a smart television, or the like. In FIG. 1, a mobile phone is illustrated as an example.

The electronic device 1000 may display an image IM on a display surface IS parallel to a first direction DR1 and a second direction DR2. The display surface IS, on which the image IM is displayed, may correspond to a front surface of the electronic device 1000. The image IM may include a still image as well as a dynamic image. The normal direction of the display surface IS, in other words, the thickness direction of the electronic device 1000 is indicated by a third direction DR3. Front surfaces (or, upper surfaces) and rear surfaces (or, lower surfaces) of layers or units to be described below are distinguished from each other based on the third direction DR3.

The display surface IS of the electronic device 1000 may be divided into a display region DA and a peripheral region NDA. The display region DA may be a region on which the image IM is displayed. A user views the image IM through the display region DA. In this embodiment, the display region DA is illustrated in a rounded rectangular shape. However, this is illustrative, and the display region DA may have various shapes and is not limited to any one embodiment.

The peripheral region NDA is adjacent to the display region DA. The peripheral region NDA may have a predetermined color. The peripheral region NDA may be referred to as a non-display region or a bezel region. The peripheral region NDA may surround the display region DA. Accordingly, the shape of the display region DA may be substantially defined by the peripheral region NDA. However, this is illustrative, and the peripheral region NDA may be disposed adjacent to only one side of the display region DA, or may be omitted. The electronic device 1000 according to an embodiment of the present disclosure may include various embodiments and is not limited to any one embodiment.

Figure 2:
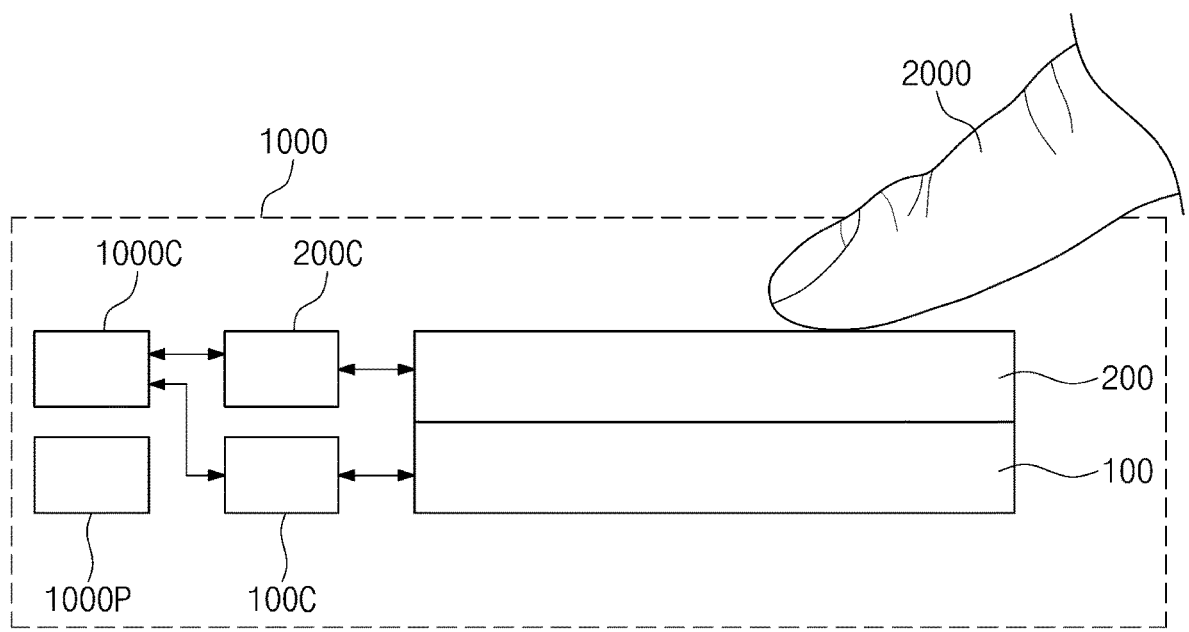
FIG. 2 is a schematic block diagram illustrating an example of the use of the electronic device according to an embodiment of the present disclosure.

FIG. 2 is a schematic block diagram illustrating an example of the use of the electronic device 1000 according to an embodiment of the present disclosure.

Referring to FIG. 2, the electronic device 1000 may include a display layer 100, a sensor layer 200, a display driver 100C, a sensor driver 200C, a main driver 1000C, and a power circuit 1000P.

The display layer 100 may be a component that substantially generates an image. The display layer 100 may be an emissive display layer. For example, the display layer 100 may be an organic light emitting display layer, an inorganic light emitting display layer, an organic-inorganic light emitting display layer, a quantum-dot display layer, a micro-light emitting diode (LED) display layer, or a nano-LED display layer.

The sensor layer 200 may be disposed on the display layer 100. For example, the sensor layer 200 may overlap the display layer 100. The sensor layer 200 may sense an external input applied from the outside. The sensor layer 200 may be an integrated sensor continuously formed in a manufacturing process of the display layer 100. Alternatively, the sensor layer 200 may be an external sensor attached to the display layer 100.

The main driver 1000C may control the overall operation of the electronic device 1000. For example, the main driver 1000C may control operations of the display driver 100C and the sensor driver 200C. The main driver 1000C may include at least one microprocessor. The main driver 1000C may be referred to as a host. The main driver 1000C may further include a graphics controller.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C.

The power circuit 1000P may include a power management integrated circuit (PMIC). The power circuit 1000P may generate a plurality of drive voltages for driving the display layer 100, the sensor layer 200, the display driver 100C, and the sensor driver 200C. For example, the plurality of drive voltages may include a gate high-voltage, a gate low-voltage, an ELVSS voltage, an ELVDD voltage, an initialization voltage, and the like, but are not particularly limited to these examples.

The electronic device 1000 may sense inputs applied from the outside. For example, the electronic device 1000 may sense a passive input by a touch 2000. The touch 2000 may include all input means, such as a part of the user's body and an input device (e.g., a pen), which are capable of causing a change in capacitance. In other words, the touch 2000 may encompass any input means capable of altering the capacitance of the touch surface.

Figure 3:
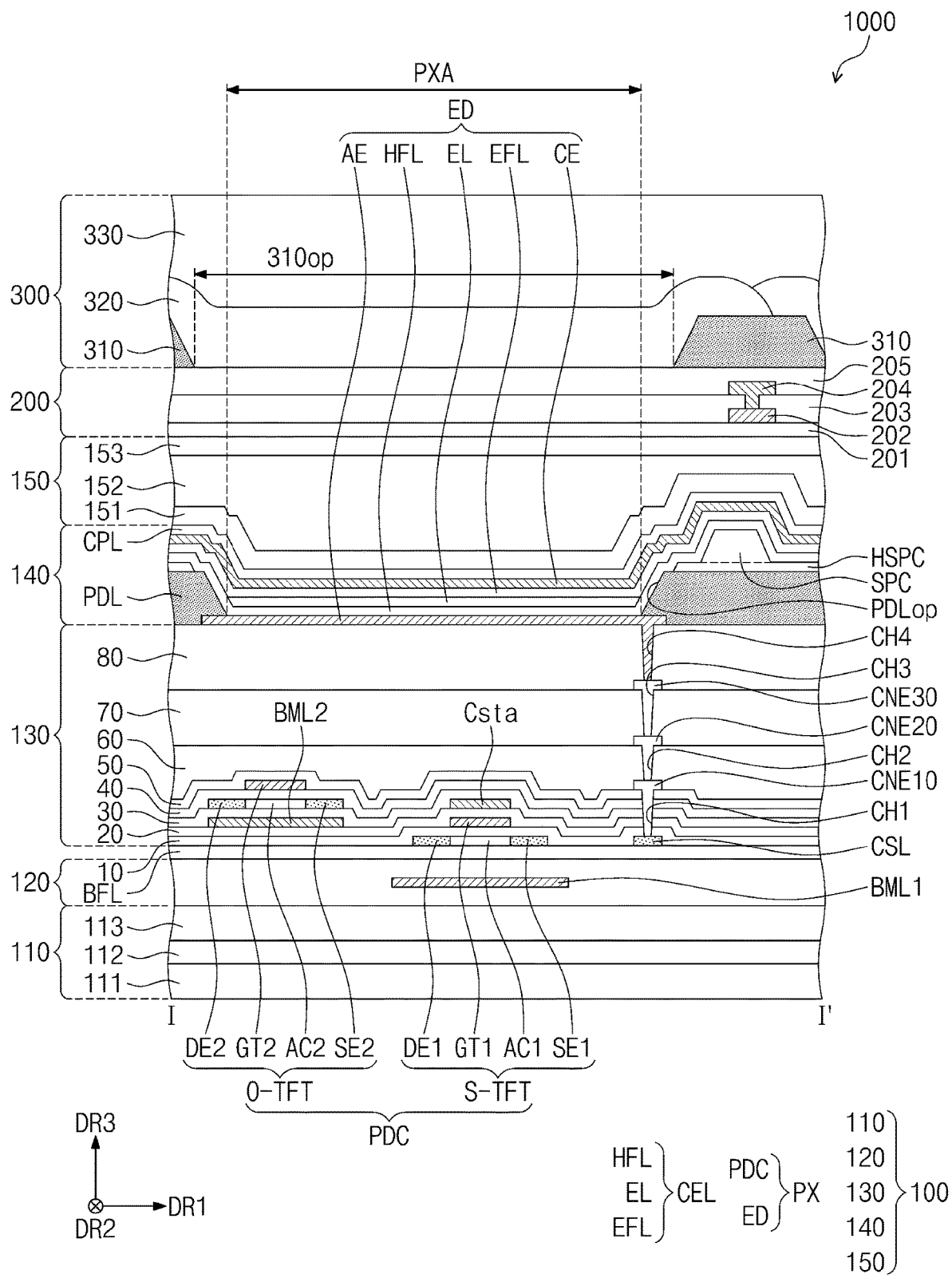
FIG. 3 is a sectional view of the electronic device according to an embodiment of the present disclosure.

FIG. 3 is a sectional view of the electronic device 1000 according to an embodiment of the present disclosure. For example, FIG. 3 may be a sectional view taken along line I-I' of FIG. 1.

Referring to FIG. 3, the electronic device 1000 may include the display layer 100, the sensor layer 200, and an anti-reflection layer 300. The display layer 100 may include a base layer 110, a barrier layer 120, a buffer layer BFL, a circuit layer 130, an element layer 140, and an encapsulation layer 150.

The base layer 110 may have a single-layer structure or a multi-layer structure. For example, the base layer 110 may include first, second and third sub-base layers 111, 112, and 113. Each of the first sub-base layer 111 and the third sub-base layer 113 may include at least one of a polyimide-based resin, an acrylate-based resin, a methacrylate-based resin, a polyisoprene-based resin, a vinyl-based resin, an epoxy-based resin, a urethane-based resin, a celluose-based resin, a siloxane-based resin, a polyamide-based resin, and a perylene-based resin. A "~~"-based resin used herein may mean a resin including a "~~" functional group. For example, each of the first sub-base layer 111 and the third sub-base layer 113 may include polyimide.

The second sub-base layer 112 may have a single-layer structure or a multi-layer structure. For example, the second sub-base layer 112 may include an inorganic material and may include at least one of silicon oxide, silicon nitride, silicon oxy-nitride, and amorphous silicon. For example, the second sub-base layer 112 may include silicon oxy-nitride and silicon oxide stacked thereon.

The barrier layer 120 may be disposed on the base layer 110. The barrier layer 120 may have a single-layer structure or a multi-layer structure. The barrier layer 120 may include at least one of silicon oxide, silicon nitride, silicon oxy-nitride, and amorphous silicon.

The barrier layer 120 may further include a first lower light blocking layer BML1. For example, when the barrier layer 120 has a multi-layer structure, the first lower light blocking layer BML1 may be disposed between layers constituting the barrier layer 120. However, without being limited thereto, the first lower light blocking layer BML1 may be disposed between the base layer 110 and the barrier layer 120, or may be disposed on the barrier layer 120. In an embodiment, the first lower light blocking layer BML1 may be omitted. The first lower light blocking layer BML1 may be referred to as a first lower layer, a first lower metal layer, a first lower electrode layer, a first lower shielding layer, a first light blocking layer, a first metal layer, a first shielding layer, or a first overlap layer.

The buffer layer BFL may be disposed on the barrier layer 120. The buffer layer BFL may prevent diffusion of metal atoms or impurities from the base layer 110 to a first semiconductor pattern. Furthermore, the buffer layer BFL may allow the first semiconductor pattern to be uniformly formed, by adjusting the speed at which heat is provided during a crystallization process for forming the first semiconductor pattern.

The buffer layer BFL may include a plurality of inorganic layers. For example, the buffer layer BFL may include a first sub-buffer layer including silicon nitride and a second sub-buffer layer that is disposed on the first sub-buffer layer and that includes silicon oxide.

The circuit layer 130 may be disposed on the buffer layer BFL, and the element layer 140 may be disposed on the circuit layer 130. A pixel PX may include a pixel circuit PDC and a light emitting element ED electrically connected to the pixel circuit PDC. The pixel circuit PDC may be included in the circuit layer 130, and the light emitting element ED may be included in the element layer 140.

A silicon thin film transistor S-TFT and an oxide thin film transistor O-TFT of the pixel circuit PDC are illustrated as an example in FIG. 3. However, transistors constituting the pixel circuit PDC may all be silicon thin film transistors S-TFT or oxide thin film transistors O-TFT.

The first semiconductor pattern may be disposed on the buffer layer BFL. The first semiconductor pattern may include a silicon semiconductor. For example, the silicon semiconductor may include amorphous silicon or polycrystalline silicon. For example, the first semiconductor pattern may include low-temperature poly silicon.

FIG. 3 illustrates only a portion of the first semiconductor pattern disposed on the buffer layer BFL, and the first semiconductor pattern may be additionally disposed in other regions. The first semiconductor pattern may be arranged across pixels according to a specific rule. The first semiconductor pattern may have different electrical properties depending on whether the first semiconductor pattern is doped or not. The first semiconductor pattern may include a first region having a high conductivity and a second region having a low conductivity. The first region may be doped with an N-type dopant or a P-type dopant. A P-type transistor may include a doped region that is doped with a P-type dopant, and an N-type transistor may include a doped region that is doped with an N-type dopant. The second region may be an un-doped region, or may be a region more lightly doped than the first region.

The first region may have a higher conductivity than the second region and may substantially serve as an electrode or a signal line. In other words, the first region may function as an electrode or a signal line. The second region may substantially correspond to an active region (or, a channel) of a transistor. In other words, one portion of the first semiconductor pattern may be an active region of the transistor, another portion of the first semiconductor pattern may be a source or drain of the transistor, and yet another portion of the first semiconductor pattern may be a connecting electrode or a connecting signal line.

A source region SE1, an active region AC1, and a drain region DE1 of the silicon thin film transistor S-TFT may be formed from the first semiconductor pattern. The source region SE1 and the drain region DE1 may extend from the active region AC1 in opposite directions on the buffer layer BFL.

In FIG. 3, a portion of a connecting signal line CSL formed from the first semiconductor pattern is illustrated.

The circuit layer 130 may include a plurality of inorganic layers and a plurality of organic layers. In an embodiment, first, second, third, fourth and fifth insulating layers 10, 20, 30, 40, and 50 sequentially stacked on the buffer layer BFL may be inorganic layers, and sixth, seventh and eighth insulating layers 60, 70, and 80 may be organic layers.

The first insulating layer 10 may be disposed on the buffer layer BFL. The first insulating layer 10 may cover the first semiconductor pattern. The first insulating layer 10 may be an inorganic layer and/or an organic layer and may have a single-layer structure or a multi-layer structure. The first insulating layer 10 may include at least one of aluminum oxide, titanium oxide, silicon oxide, silicon nitride, silicon oxy-nitride, zirconium oxide, and hafnium oxide. In this embodiment, the first insulating layer 10 may be a single silicon oxide layer. Not only the first insulating layer 10 but also an insulating layer of the circuit layer 130 to be described below may have a single-layer structure or a multi-layer structure.

A gate electrode GT1 of the silicon thin film transistor S-TFT may be disposed on the first insulating layer 10. The gate electrode GT1 may be a portion of a metal pattern. The gate electrode GT1 may overlap the active region AC1 with a portion of the first insulating layer 10 therebetween. The gate electrode GT1 may function as a mask in a process of doping the first semiconductor pattern. The gate electrode GT1 may include titanium, silver, an alloy containing silver, molybdenum, an alloy containing molybdenum, aluminum, an alloy containing aluminum, aluminum nitride, tungsten, tungsten nitride, copper, indium tin oxide, or indium zinc oxide, but is not particularly limited thereto.

The second insulating layer 20 may be disposed on the first insulating layer 10 and may cover the gate electrode GT1. The second insulating layer 20 may be an inorganic layer and may have a single-layer structure or a multi-layer structure. The second insulating layer 20 may include at least one of silicon oxide, silicon nitride, and silicon oxy-nitride. In this embodiment, the second insulating layer 20 may have a single-layer structure including a silicon nitride layer.

The third insulating layer 30 may be disposed on the second insulating layer 20. The third insulating layer 30 may be an inorganic layer and may have a single-layer structure or a multi-layer structure. For example, the third insulating layer 30 may have a multi-layer structure including a silicon oxide layer and a silicon nitride layer. One electrode (or a first electrode) Csta of a capacitor may be disposed between the second insulating layer 20 and the third insulating layer 30. Furthermore, the other electrode (or a second electrode) of the capacitor may be disposed between the first insulating layer 10 and the second insulating layer 20.

A second semiconductor pattern may be disposed on the third insulating layer 30. The second semiconductor pattern may include an oxide semiconductor. The oxide semiconductor may include a plurality of regions distinguished from each other depending on whether metal oxide is reduced or not. A region where metal oxide is reduced (hereinafter, referred to as the reduced region) has a higher conductivity than a region where metal oxide is not reduced (hereinafter, referred to as the non-reduced region). The reduced region substantially serves as a source/drain of a transistor or a signal line. The non-reduced region substantially corresponds to an active region (or, a semiconductor region or a channel) of the transistor. In other words, one portion of the second semiconductor pattern may be an active region of the transistor, another portion of the second semiconductor pattern may be a source/drain region of the transistor, and yet another portion of the second semiconductor pattern may be a signal transmission region.

A source region SE2, an active region AC2, and a drain region DE2 of the oxide thin film transistor O-TFT may be formed from the second semiconductor pattern. The source regions SE2 and the drain regions DE2 may extend from the active regions AC2 in opposite directions on the third insulating layer 30.

The fourth insulating layer 40 may be disposed on the third insulating layer 30. The fourth insulating layer 40 may cover the second semiconductor pattern. The fourth insulating layer 40 may be an inorganic layer and may have a single-layer structure or a multi-layer structure. The fourth insulating layer 40 may include at least one of aluminum oxide, titanium oxide, silicon oxide, silicon nitride, silicon oxy-nitride, zirconium oxide, and hafnium oxide. In this embodiment, the fourth insulating layer 40 may have a single-layer structure including silicon oxide.

A gate electrode GT2 of the oxide thin film transistor O-TFT may be disposed on the fourth insulating layer 40. The gate electrode GT2 may be a portion of a metal pattern. The gate electrode GT2 overlaps the active region AC2. The gate electrode GT2 may function as a mask in a process of reducing the second semiconductor pattern.

A second lower light blocking layer BML2 may be disposed under the oxide thin film transistor O-TFT. The second lower light blocking layer BML2 may be disposed between the second insulating layer 20 and the third insulating layer 30. The second lower light blocking layer BML2 may include the same material as the one electrode Csta constituting the capacitor and may be formed through the same process as that of the one electrode Csta of the capacitor.

The fifth insulating layer 50 may be disposed on the fourth insulating layer 40 and may cover the gate electrode GT2. The fifth insulating layer 50 may be an inorganic layer and/or an organic layer and may have a single-layer structure or a multi-layer structure. For example, the fifth insulating layer 50 may have a multi-layer structure including a silicon oxide layer and a silicon nitride layer.

A first connecting electrode CNE10 may be disposed on the fifth insulating layer 50. The first connecting electrode CNE10 may be connected to the connecting signal line CSL through a first contact hole CH1 penetrating the first to fifth insulating layers 10, 20, 30, 40, and 50.

The sixth insulating layer 60 may be disposed on the fifth insulating layer 50. A second connecting electrode CNE20 may be disposed on the sixth insulating layer 60. The second connecting electrode CNE20 may be connected to the first connecting electrode CNE10 through a second contact hole CH2 penetrating the sixth insulating layer 60.

The seventh insulating layer 70 may be disposed on the sixth insulating layer 60 and may cover the second connecting electrode CNE20.

A third connecting electrode CNE30 may be disposed on the seventh insulating layer 70. The third connecting electrode CNE30 may be connected to the second connecting electrode CNE20 through a third contact hole CH3 penetrating the seventh insulating layer 70. The eighth insulating layer 80 may be disposed on the seventh insulating layer 70 and may cover the third connecting electrode CNE30. The first, second and third connecting electrodes CNE10-CNE30 may overlap each other in the third direction DR3.

The sixth insulating layer 60, the seventh insulating layer 70, and the eighth insulating layer 80 may be organic layers. For example, each of the sixth insulating layer 60, the seventh insulating layer 70, and the eighth insulating layer 80 may include a general purpose polymer, such as benzocyclobutene (BCB), polyimide, hexamethyldisiloxane (HMDSO), Polymethylmethacrylate (PMMA), or Polystyrene (PS), a polymer derivative having a phenolic group, an acrylate-based polymer, an imide-based polymer, an aryl ether-based polymer, an amide-based polymer, a fluorine-based polymer, a p-xylene-based polymer, a vinyl alcohol-based polymer, or a blend thereof.

The light emitting element ED may include a first electrode AE, a first functional layer HFL, an emissive layer EL, a second functional layer EFL, and a second electrode CE. The first functional layer HFL, the second functional layer EFL, and the second electrode CE may be commonly provided for pixels PX. The first functional layer HFL, the emissive layer EL, and the second functional layer EFL may be referred to as an intermediate layer CEL. The first electrode AE may be referred to as a pixel electrode or an anode, and the second electrode CE may be referred to as a common electrode or a cathode.

The first electrode AE may be disposed on the eighth insulating layer 80. For example, the first electrode AE may be in direct contact with the eighth insulating layer 80. The first electrode AE may be connected to the third connecting electrode CNE30, which is electrically connected to the pixel circuit PDC, through a fourth contact hole CH4 penetrating the eighth insulating layer 80.

In an embodiment of the present disclosure, the third connecting electrode CNE30 may be omitted. In this case, the first electrode AE may penetrate the seventh and eighth insulating layers 70 and 80 and may be connected to the second connecting electrode CNE20. Furthermore, in an embodiment of the present disclosure, the third connecting electrode CNE30 and the eighth insulating layer 80 may be omitted. In this case, the first electrode AE may be disposed on the seventh insulating layer 70. The first electrode AE may penetrate the seventh insulating layer 70 and may be connected to the second connecting electrode CNE20.

The first electrode AE may be a transparent electrode, a translucent electrode, or a reflective electrode. In an embodiment, the first electrode AE may include a reflective layer formed of silver, magnesium, aluminum, platinum, palladium, gold, nickel, neodymium, iridium, chromium, or a compound thereof and a transparent or translucent electrode layer formed on the reflective layer. The transparent or translucent electrode layer may include at least one selected from the group consisting of indium tin oxide, indium zinc oxide, indium gallium zinc oxide, zinc oxide, or indium oxide and aluminum-doped zinc oxide. For example, the first electrode AE may include a multi-layer structure in which indium tin oxide, silver, and indium tin oxide are sequentially stacked one above another.

A pixel defining layer PDL may be disposed on the eighth insulating layer 80. The pixel defining layer PDL may have a property of absorbing light. For example, the pixel defining layer PDL may be black in color. The pixel defining layer PDL may include a black coloring agent. The black coloring agent may include a black dye or a black pigment. The black coloring agent may include carbon black, metal such as chromium, or oxide thereof.

The pixel defining layer PDL may have an opening PDLop for exposing a portion of the first electrode AE. In other words, the pixel defining layer PDL may cover the periphery of the first electrode AE. An emissive region PXA may be defined by the pixel defining layer PDL. For example, the emissive region PXA may be formed in the opening PDLop of the pixel defining layer PDL.

A spacer HSPC may be disposed on the pixel defining layer PDL. A protruding spacer SPC may be disposed on the spacer HSPC. The spacer HSPC and the protruding spacer SPC may be integrally formed with each other and may be formed of the same material. For example, the spacer HSPC and the protruding spacer SPC may be formed through the same process by a half-tone mask. However, this is an example, and the present disclosure is not limited thereto. For example, the spacer HSPC and the protruding spacer SPC may include different materials and may be formed by separate processes.

The first functional layer HFL may be disposed on the first electrode AE, the pixel defining layer PDL, the spacer HSPC, and the protruding spacer SPC. The first functional layer HFL may include a hole transport layer, may include a hole injection layer, or may include both the hole transport layer and the hole injection layer. The first functional layer HFL may be disposed in the entire display region.

The emissive layer EL may be disposed on the first functional layer HFL and may be disposed in a region corresponding to the opening PDLop of the pixel defining layer PDL. The emissive layer EL may include an organic material, an inorganic material, or an organic-inorganic material that emits light having a predetermined color.

The second functional layer EFL may be disposed on the first functional layer HFL and may cover the emissive layer EL. The second functional layer EFL may include an electron transport layer, may include an electron injection layer, or may include both the electron transport layer and the electron injection layer. The second functional layer EFL may be disposed in the entire display region.

The second electrode CE may be disposed on the second functional layer EFL. The second electrode CE may be disposed in the display region. The second electrode CE may further be disposed to overlap the pixel defining layer PDL, the spacer HSPC, and the protruding spacer SPC.

The element layer 140 may further include a capping layer CPL disposed on the second electrode CE. The capping layer CPL may be utilized to enhance the efficiency of light emission through the principle of constructive interference. The capping layer CPL may include, for example, a material having a refractive index of 1.6 or more for light having a wavelength of 589 nm. The capping layer CPL may be an organic capping layer including an organic material, an inorganic capping layer including an inorganic material, or a composite capping layer including an organic material and an inorganic material. For example, the capping layer may include a carbocyclic compound, a heterocyclic compound, an amine group-containing compound, a porphine derivative, a phthalocyanine derivative, a naphthalocyanine derivative, an alkali metal complex, an alkaline earth metal complex, or a combination thereof. The carbocyclic compound, the heterocyclic compound, and the amine group-containing compound may be selectively replaced with a substituent including oxygen (O), nitrogen (N), sulfur (S), selenium (Se), silicon (Si), fluorine (F), chlorine (Cl), bromine (Br), iodine (I), or a combination thereof.

The encapsulation layer 150 may be disposed on the element layer 140. The encapsulation layer 150 may include a first inorganic encapsulation layer 151, an organic encapsulation layer 152, and a second inorganic encapsulation layer 153 that are sequentially stacked one above another. The first and second inorganic encapsulation layers 151 and 153 may protect the element layer 140 from moisture and oxygen, and the organic encapsulation layer 152 may protect the element layer 140 from foreign matter such as dust particles.

In an embodiment of the present disclosure, a low-refractive index layer may be additionally disposed between the capping layer CPL and the encapsulation layer 150. The low-refractive index layer may include lithium fluoride. The low-refractive index layer may be formed by a thermal deposition method.

The sensor layer 200 may be disposed on the display layer 100. The sensor layer 200 may be referred to as a sensor, an input sensing layer, or an input sensing panel. The sensor layer 200 may include a sensor base layer 201, a first sensor conductive layer 202, a sensor insulating layer 203, a second sensor conductive layer 204, and a sensor cover layer 205.

The sensor base layer 201 may be directly disposed on the display layer 100. For example, the sensor base layer 201 may be directly disposed on the second inorganic encapsulation layer 153. The sensor base layer 201 may be an inorganic layer including at least one of silicon nitride, silicon oxy-nitride, and silicon oxide. Alternatively, the sensor base layer 201 may be an organic layer including an epoxy resin, an acrylic resin, or an imide-based resin. The sensor base layer 201 may have a single-layer structure, or may have a multi-layer structure stacked in the third direction DR3.

Each of the first sensor conductive layer 202 and the second sensor conductive layer 204 may have a single-layer structure, or may have a multi-layer structure stacked in the third direction DR3.

A conductive layer (e.g., the first sensor conductive layer 202 or the second sensor conductive layer 204) having a single-layer structure may include a metal layer or a transparent conductive layer. The metal layer may include molybdenum (Mo), silver (Ag), titanium (Ti), copper (Cu), aluminum (Al), or an alloy thereof. The transparent conductive layer may include transparent conductive oxide such as indium tin oxide, indium zinc oxide, zinc oxide, or indium zinc tin oxide. In addition, the transparent conductive layer may include a conductive polymer such as poly(3,4-ethylenedioxythiophene) (PEDOT), a metal nano wire, or graphene.

A conductive layer having a multi-layer structure may include metal layers. The meal layers may have, for example, a three-layer structure of titanium/aluminum/titanium. The conductive layer having the multi-layer structure may include at least one metal layer and at least one transparent conductive layer.

The sensor insulating layer 203 may be disposed between the first sensor conductive layer 202 and the second sensor conductive layer 204. The sensor insulating layer 203 may include an organic film. The organic film may include at least one of an acrylate-based resin, a methacrylate-based resin, a polyisoprene-based resin, a vinyl-based resin, an epoxy-based resin, a urethane-based resin, a celluose-based resin, a siloxane-based resin, a polyimide-based resin, a polyamide-based resin, and a perylene-based resin. The first sensor conductive layer 202 and the second sensor conductive layer 204 may be connected to each other through a hole in the sensor insulating layer 203.

Alternatively, the sensor insulating layer 203 may include an inorganic film. The inorganic film may include at least one of aluminum oxide, titanium oxide, silicon oxide, silicon nitride, silicon oxy-nitride, zirconium oxide, and hafnium oxide.

The sensor cover layer 205 may be disposed on the sensor insulating layer 203 and may cover the second sensor conductive layer 204. The second sensor conductive layer 204 may include a conductive pattern. The sensor cover layer 205 may cover the conductive pattern and may reduce or eliminate a probability of damage to the conductive pattern in a subsequent process. The sensor cover layer 205 may include an inorganic material. For example, the sensor cover layer 205 may include silicon nitride, but is not particularly limited thereto. In an embodiment of the present disclosure, the sensor cover layer 205 may be omitted.

The anti-reflection layer 300 may be disposed on the sensor layer 200. The anti-reflection layer 300 may include a dividing layer 310, a plurality of color filters 320, and a planarization layer 330.

The dividing layer 310 may overlap the conductive pattern of the second sensor conductive layer 204. The sensor cover layer 205 may be disposed between the dividing layer 310 and the second sensor conductive layer 204. The dividing layer 310 may prevent reflection of external light by the second sensor conductive layer 204. A material constituting the dividing layer 310 is not particularly limited as long as can absorb light. The dividing layer 310 may be a black layer. In an embodiment, the dividing layer 310 may include a black coloring agent. The black coloring agent may include a black dye or a black pigment. The black coloring agent may include carbon black, metal such as chromium, or oxide thereof.

The dividing layer 310 may have a dividing opening 310op defined therein. The dividing opening 310op may overlap the emissive layer EL. The color filter 320 may be disposed to correspond to the dividing opening 310op. In other words, the color filter 320 may be provided in the dividing opening 310op. The color filter 320 may transmit light provided from the emissive layer EL overlapping the color filter 320.

The planarization layer 330 may cover the dividing layer 310 and the color filter 320. The planarization layer 330 may include an organic material and may provide a flat surface on an upper surface of the planarization layer 330. In an embodiment, the planarization layer 330 may be omitted.

In an embodiment of the present disclosure, the anti-reflection layer 300 may include a reflection control layer instead of the color filters 320. For example, the color filter 320 may be omitted in FIG. 3, and the reflection control layer may be added at the place where the color filter 320 is omitted. The reflection control layer may selectively absorb light in a partial band of light reflected inside the display panel and/or the electronic device 1000 or light in a partial band of light incident from outside the display panel and/or the electronic device 1000.

For example, the reflection control layer may absorb light in a first wavelength region of 490 nm to 505 nm and a second wavelength region of 585 nm to 600 nm, and thus the light transmittance in the first wavelength region and the second wavelength region may be 40% or less. The reflection control layer may absorb light outside the wavelength ranges of red light, green light, and blue light emitted from the emissive layers EL. Since the reflection control layer absorbs light outside the wavelength range of the red light, the green light, or the blue light emitted from the emissive layers EL as described above, a decrease in the luminance of the display panel and/or the electronic device 1000 may be prevented or minimized. In addition, deterioration in the light emission efficiency of the display panel and/or the electronic device 1000 may be prevented or minimized, and visibility may be improved.

The reflection control layer may be implemented with an organic layer including a dye, a pigment, or a combination thereof. The reflection control layer may include a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, and a combination thereof.

In an embodiment, the reflection control layer may have a transmittance of about 64% to about 72%. The transmittance of the reflection control layer may be adjusted depending on the content of the pigment and/or dye included in the reflection control layer.

In an embodiment of the present disclosure, the anti-reflection layer 300 may include a phase retarder and/or a polarizer. The anti-reflection layer 300 may include at least a polarizer film. In this case, the anti-reflection layer 300 may be attached to the sensor layer 200 through an adhesive layer.

Figure 4:
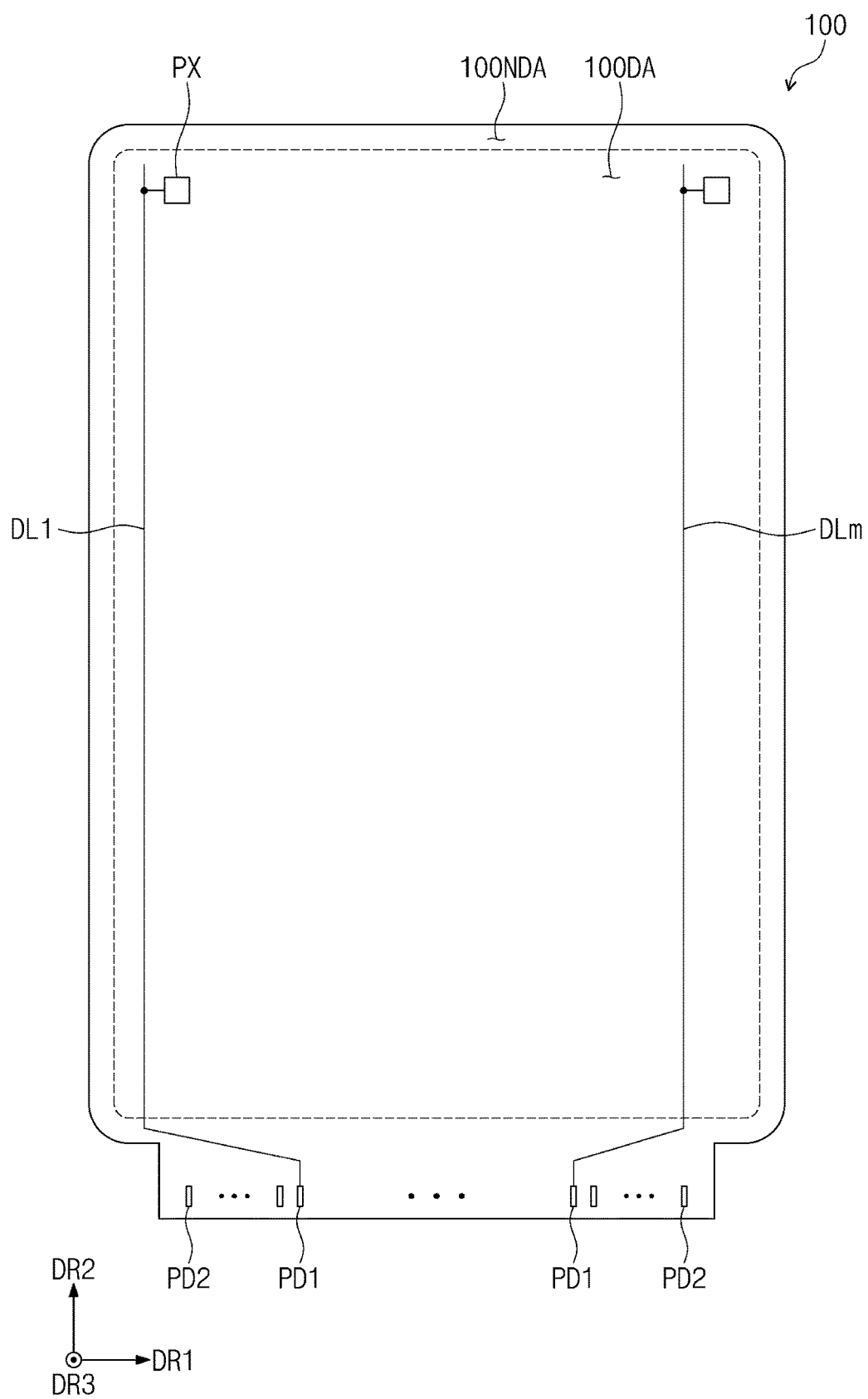
FIG. 4 is a plan view of a display layer according to an embodiment of the present disclosure.

FIG. 4 is a plan view of the display layer 100 according to an embodiment of the present disclosure.

Referring to FIG. 4, the display layer 100 may have a display region 100DA and a peripheral region 100NDA. The display region 100DA may display an image, and the peripheral region 100NDA may be adjacent to the display region 100DA. The display region 100DA may correspond to the display region DA (refer to FIG. 1) of the electronic device 1000 (refer to FIG. 1), and the peripheral region 100NDA may correspond to the peripheral region NDA (refer to FIG. 1) of the electronic device 1000 (refer to FIG. 1). The expression "one region/portion corresponds to another region/portion" used herein may mean that the regions/portions overlap each other and is not limited to having the same area.

In FIG. 4, some components included in the display layer 100 are illustrated. The display layer 100 may include a plurality of pixels PX, a plurality of lines DLl to DLm, a plurality of first pads PD1, and a plurality of second pads PD2. The display layer 100 may further include components other than those illustrated in FIG. 4. Furthermore, in an embodiment of the present disclosure, the display layer 100 may not include the second pads PD2.

The display region 100DA and the peripheral region 100NDA may be distinguished from each other depending on whether the pixels PX are disposed or not. The pixels PX may be disposed in the display region 100DA and the pixels PX may not be disposed in the peripheral region 100NDA. The plurality of lines DL1 to DLm connected to the pixels PX may be disposed in the display region 100DA and the peripheral region 100NDA. The first pads PD1 and the second pads PD2 may be disposed in the peripheral region 100NDA. In an embodiment of the present disclosure, a driver IC may be mounted on the peripheral region 100NDA, or a flexible circuit film having the driver IC mounted thereon may be electrically connected to the first pads PD1.

Figure 5:
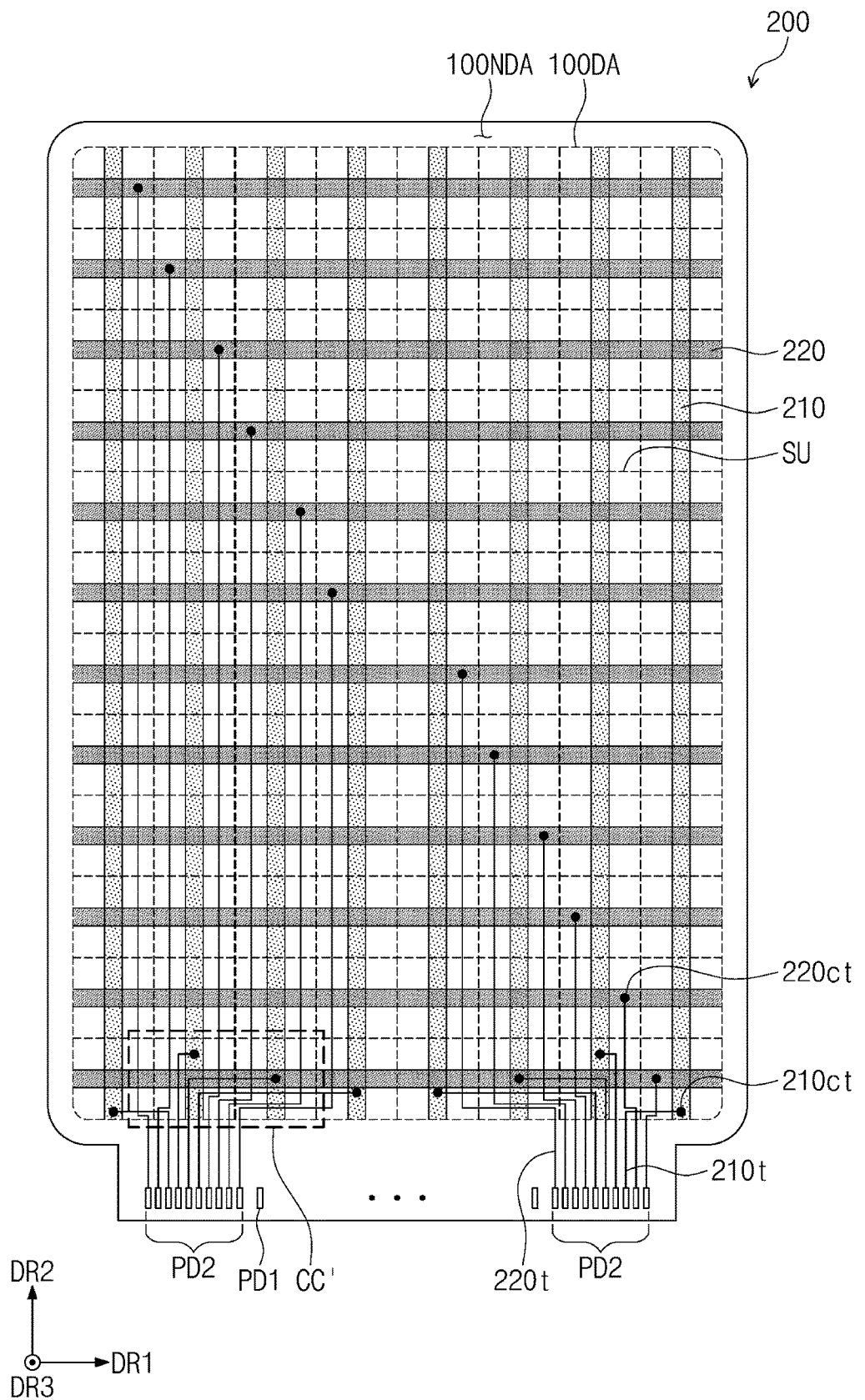
FIG. 5 is a plan view of a sensor layer according to an embodiment of the present disclosure.

FIG. 5 is a plan view of the sensor layer 200 according to an embodiment of the present disclosure.

Referring to FIG. 5, the sensor layer 200 may include a plurality of first electrodes 210 and a plurality of second electrodes 220. The first electrodes 210 may be arranged in the first direction DR1, and the second electrodes 220 may be arranged in the second direction DR2 crossing the first direction DR1. The first electrodes 210 may extend in the second direction DR2 and may cross the second electrodes 220. The second electrodes 220 may extend in the first direction DR1 and may cross the first electrodes 210.

The display region 100DA and the peripheral region 100NDA of the display layer 100 (refer to FIG. 4) are illustrated in the sensor layer 200 of FIG. 5. The first electrodes 210 and the second electrodes 220 may overlap the display region 100DA.

Although eight first electrodes 210 and twelve second electrodes 220 are illustrated as an example in FIG. 5, the number of first electrodes 210 and the number of second electrodes 220 are not particularly limited thereto. For example, the number of first electrodes 210 and the number of second electrodes 220 may be changed depending on the screen aspect ratio of the electronic device 1000 (refer to FIG. 1).

The sensor layer 200 may include a plurality of first trace lines 210t electrically connected with the first electrodes 210, respectively, and a plurality of second trace lines 220t electrically connected with the second electrodes 220, respectively.

In an embodiment of the present disclosure, the second trace lines 220t may extend to overlap the display region 100DA. For example, the second trace lines 220t may not be disposed in the peripheral regions 100NDA that are adjacent to the display region 100DA in the first direction DR1. In other words, the second trace lines 220t may not be disposed on left or right sides of the display region 100DA. Accordingly, the area of the peripheral region 100NDA may be reduced. Thus, the area occupied by the peripheral region NDA (refer to FIG. 1) on the display surface IS (refer to FIG. 1) of the electronic device 1000 (refer to FIG. 1) may be reduced, and a narrow bezel may be implemented.

The first electrodes 210 and the first trace lines 210t may be connected through a plurality of first contacts 210ct. The second electrodes 220 and the second trace lines 220t may be connected through a plurality of second contacts 220ct. In an embodiment of the present disclosure, all of the first contacts 210ct and the second contacts 220ct may overlap the display region 100DA. Accordingly, portions of the first trace lines 210t and the second trace lines 220t may overlap the display region 100DA, and the other portions thereof may overlap the peripheral region 100NDA.

According to an embodiment of the present disclosure, the portions of the first trace lines 210t and the portions of the second trace lines 220t that overlap the peripheral region 100NDA may all extend in the second direction DR2 and may be electrically connected with the second pads PD2. For example, the portions of the first trace lines 210t and the portions of the second trace lines 220t that overlap the peripheral region 100NDA may be located at the lower side of the display region 100DA. The second pads PD2 may be arranged in the first direction DR1. Portions of the first trace lines 210t and the second trace lines 220t that extend in the same direction as the arrangement direction of the second pads PD2 may all overlap the display region 100DA. Accordingly, the area of a portion of the peripheral region 100NDA between the region where the second pads PD2 are disposed and the display region 100DA may be reduced. In other words, the area of the peripheral region 100NDA near the lower side of the display region 100DA may be reduced.

According to an embodiment of the present disclosure, bent portions of the first trace lines 210t and bent portions of the second trace lines 220t may overlap the display region 100DA. Since the bent portions overlap the display region 100DA, the area of the peripheral region 100NDA between the display region 100DA and the region where the second pads PD2 are disposed may be reduced. Thus, the area occupied by the peripheral region NDA (refer to FIG. 1) on the display surface of the electronic device 1000 (refer to FIG. 1) may be reduced, and a narrow bezel may be implemented.

Figure 6:
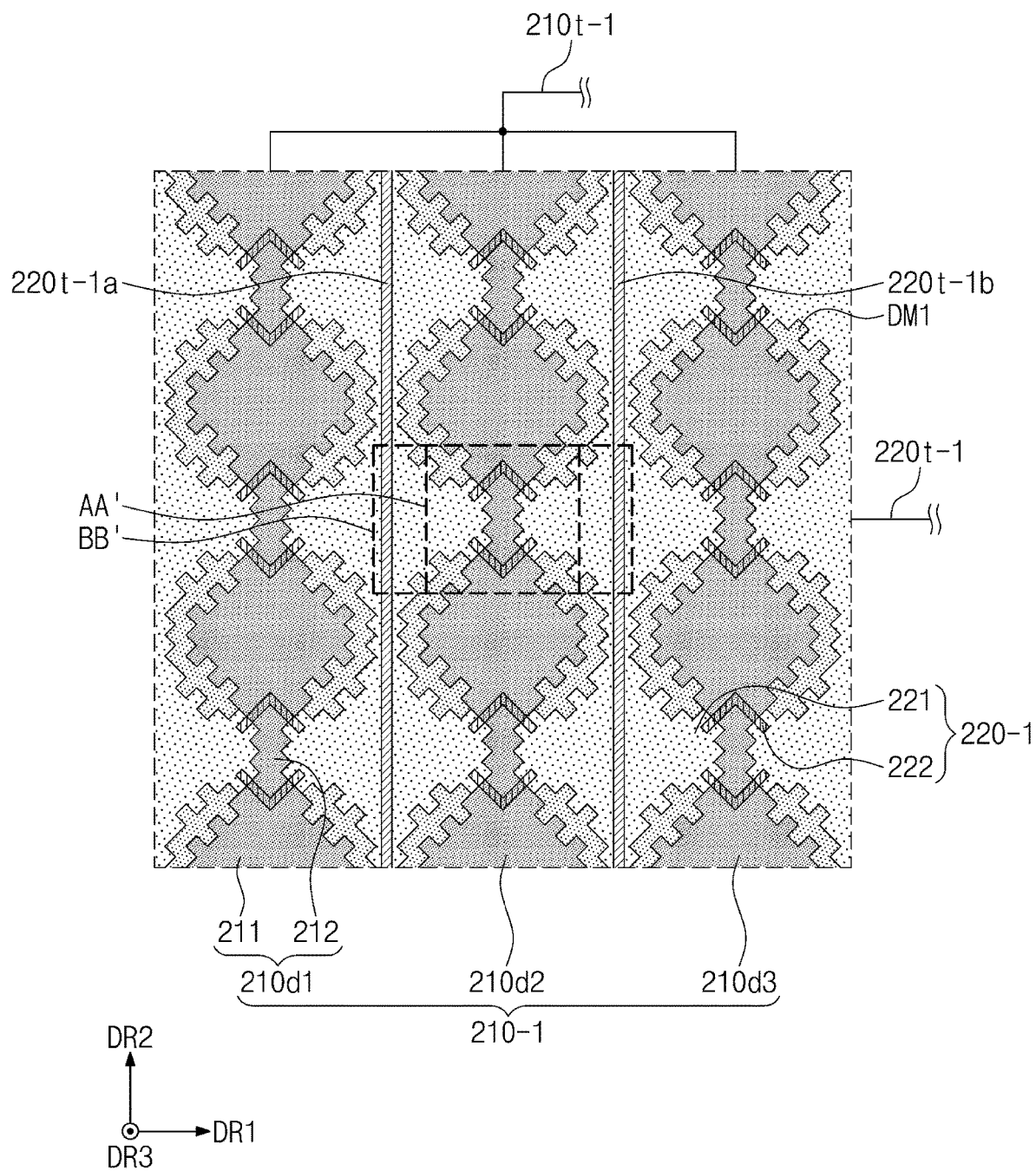
FIG. 6 is a plan view of one sensing unit according to an embodiment of the present disclosure.

FIG. 6 is a plan view of one sensing unit SU according to an embodiment of the present disclosure.

Referring to FIGS. 5 and 6, the sensor layer 200 may be divided into a plurality of sensing units SU. Each of the sensing units SU may include a corresponding crossing region among crossing regions of the first electrodes 210 and the second electrodes 220.

In FIG. 6, the one sensing unit SU is representatively illustrated, and a portion of one first electrode 210-1 and a portion of one second electrode 220-1 are illustrated. The one first electrode 210-1 may be electrically connected with one first trace line 210t-1, and the one second electrode 220-1 may be electrically connected with one second trace line 220t-1. However, without being particularly limited thereto, the one first electrode 210-1 may be electrically connected with a plurality of first trace lines that provide the same transmission signal or output the same reception signal. Alternatively, the one second electrode 220-1 may be electrically connected with a plurality of second trace lines that provide the same transmission signal or output the same reception signal.

The one first electrode 210-1 may include a plurality of segmented electrodes 210d1, 210d2, and 210d3. Although FIG. 6 illustrates an example that the one first electrode 210-1 includes three segmented electrodes 210d1, 210d2, and 210d3, the number of segmented electrodes 210d1, 210d2, and 210d3 is not particularly limited thereto. The segmented electrodes 210d1, 210d2, and 210d3 may be spaced apart from each other in the first direction DR1. Each of the segmented electrodes 210d1, 210d2, and 210d3 may extend in the second direction DR2.

Second trace lines 220t-1a and 220t-1b may be disposed between the segmented electrodes 210d1, 210d2, and 210d3. For example, the one second trace line 220t-1a may be disposed between the two adjacent segmented electrodes 210d1 and 210d2, and the one second trace line 220t-1b may be disposed between the two adjacent segmented electrodes 210d2 and 210d3. The one second trace line 220t-1a and the one second trace line 220t-1b may be electrically connected to second electrodes 220 included in sensing units SU other than the sensing unit SU illustrated in FIG. 6.

According to an embodiment of the present disclosure, the second trace lines 220t-1a and 220t-1b may not overlap the first electrodes 210 when viewed from above the plane, for example, when viewed in the third direction DR3. Accordingly, an influence of signal interference or parasitic capacitance between the first electrodes 210 and the second trace lines 220t-1a and 220t-1b may be minimized.

The second electrode 220-1 may include sensing patterns 221 and bridge patterns 222 disposed on a layer different from the sensing patterns 221. The sensing patterns 221 may be spaced apart from each other in the first direction DR1 (e.g., a segmented electrode 210d1, 210d2, or 210d3 may be located between adjacent sensing patterns 211), and the bridge patterns 222 may electrically connect the sensing patterns 221 adjacent to each other. Although FIG. 6 illustrates an example that two sensing patterns 221 adjacent to each other are electrically connected with each other by six bridge patterns 222, the present disclosure is not particularly limited thereto.

Each of the segmented electrodes 210d1, 210d2, and 210d3 may include a sensing portion 211 and a bridge portion 212. The sensing portion 211 and the bridge portion 212 may be integrally formed with each other and may be disposed on the same layer. The sensing portion 211 may be referred to as a pattern part or a first portion, and the bridge portion 212 may be referred to as a connecting portion or a second portion. Alternatively, the sensing portions 211, the bridge portions 212, the sensing patterns 221, and the bridge patterns 222 may be referred to as first sensing patterns, first bridge patterns, second sensing patterns, and second bridge patterns, respectively.

The sensor layer 200 may further include first dummy patterns DM1 disposed between the segmented electrodes 210d1, 210d2, and 210d3 and the sensing patterns 221. Each of the first dummy patterns DM1 may be disposed between a portion of the first electrode 210-1 and a portion of the second electrode 220-1. Each of the first dummy patterns DM1 may be electrically floated or grounded.

Figure 7:
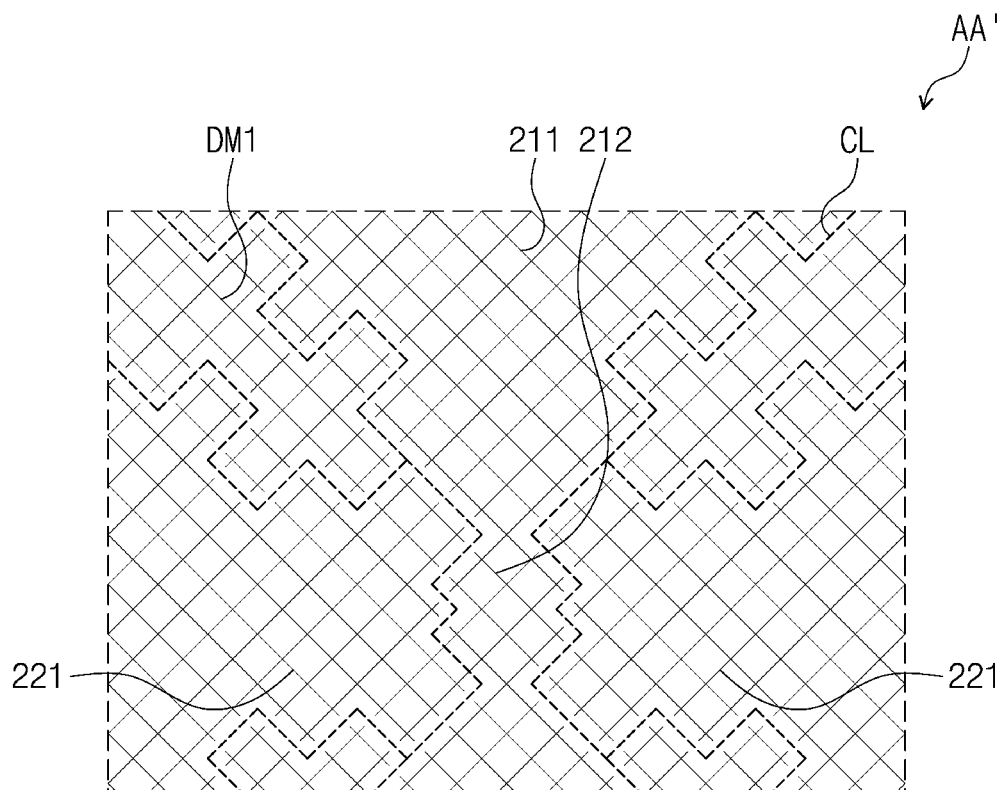
FIG. 7 is an enlarged plan view of region AA' illustrated in FIG. 6 according to an embodiment of the present disclosure.
Figure 7:
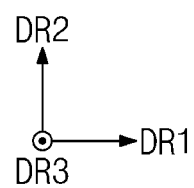
Figure 8:
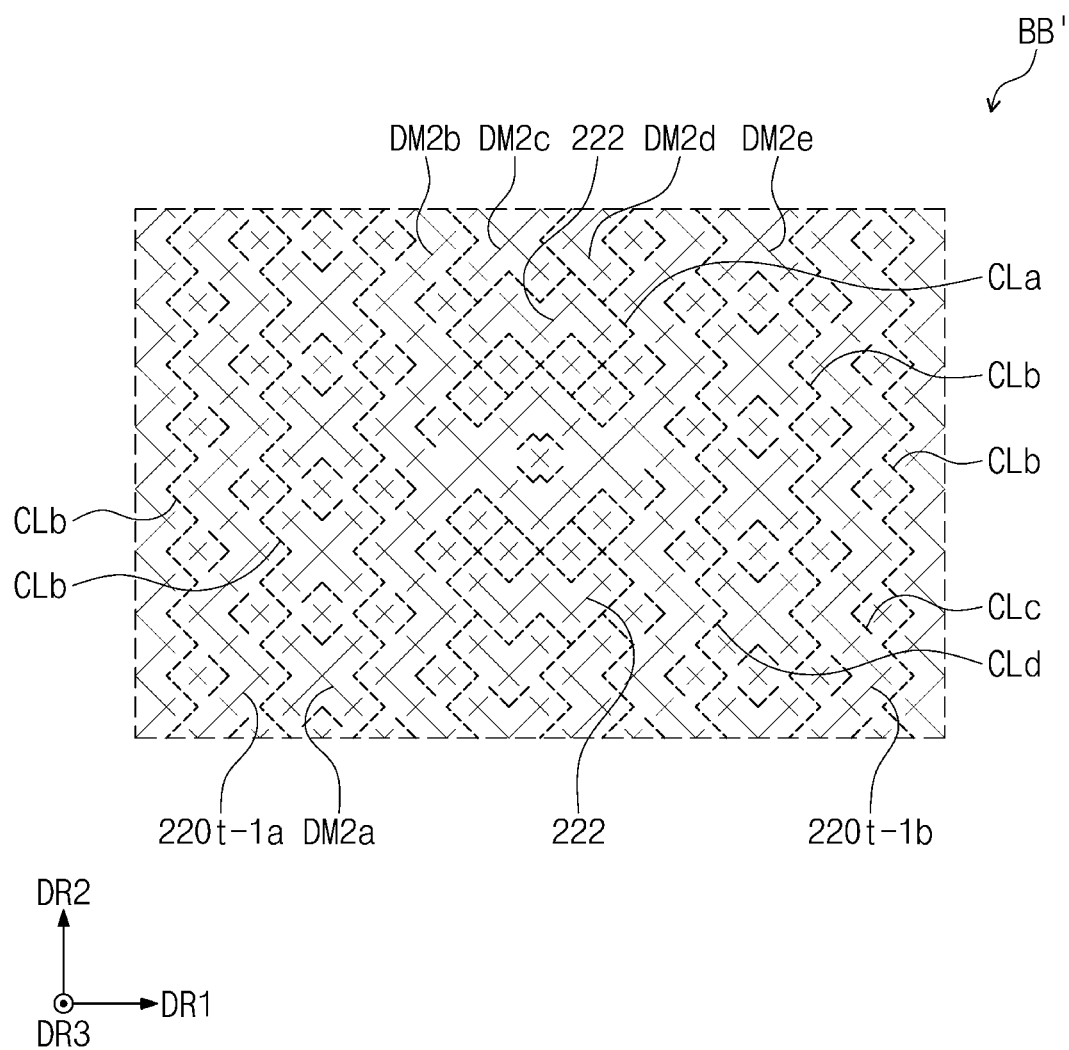
FIG. 8 is an enlarged plan view of region BB' illustrated in FIG. 6 according to an embodiment of the present disclosure.

FIG. 7 is an enlarged plan view of region AA' illustrated in FIG. 6 according to an embodiment of the present disclosure. FIG. 8 is an enlarged plan view of region BB' illustrated in FIG. 6 according to an embodiment of the present disclosure.

Referring to FIGS. 3, 7, and 8, components illustrated in FIG. 7 may be components included in the second sensor conductive layer 204, and components illustrated in FIG. 8 may be components included in the first sensor conductive layer 202. In this case, the sensor layer 200 has a structure in which the bridge patterns 222 are disposed closer to the display layer 100 than the sensing patterns 221. Accordingly, the sensor layer 200 may have a bottom bridge structure. However, the present disclosure is not limited thereto. For example, the components illustrated in FIG. 7 may be components included in the first sensor conductive layer 202, and the components illustrated in FIG. 8 may be components included in the second sensor conductive layer 204. In this case, the sensor layer 200 has a structure in which the sensing patterns 221 are disposed closer to the display layer 100 than the bridge patterns 222. Accordingly, the sensor layer 200 may have a top bridge structure.

Referring to FIGS. 6 and 7, the sensing portion 211, the bridge portion 212, the sensing pattern 221, and the first dummy patterns DM1 may be disposed on the same layer. Each of the sensing portion 211, the bridge portion 212, the sensing pattern 221, and the first dummy patterns DM1 may have a mesh structure. The sensing portion 211 and the bridge portion 212 may be electrically isolated from the sensing pattern 221, and the first dummy patterns DM1 may be electrically isolated from the sensing portion 211, the bridge portion 212, and the sensing pattern 221. In FIG. 7, a boundary CL cutting the mesh structure is illustrated by a dotted line.

Furthermore, to prevent the boundary CL from being visible to the user by reflection of external light, a visibility cut obtained by removing a portion of the mesh structure may be additionally provided to each of the sensing portion 211, the bridge portion 212, the sensing pattern 221, and the first dummy patterns DM1.

Referring to FIGS. 5, 6, and 8, the sensor layer 200 may further include second dummy patterns DM2a, DM2b, DM2c, DM2d, and DM2e. The second dummy patterns DM2a, DM2b, DM2c, DM2d, and DM2e may be disposed on the same layer as the second trace lines 220t-1a and 220t-1b and the bridge patterns 222. Each of the second dummy patterns DM2a, DM2b, DM2c, DM2d, and DM2e may be electrically floated. The second dummy patterns DM2a, DM2b, DM2c, DM2d, and DM2e may be referred to as dummy patterns. In an embodiment of the present disclosure, the second dummy patterns DM2a, DM2b, DM2c, DM2d, and DM2e may be omitted.

In FIG. 8, first, second, third and fourth boundaries CLa, CLb, CLc, and CLd cutting the mesh structure are illustrated by dotted lines. Portions of the first sensor conductive layer 202 other than the bridge patterns 222 and the second trace lines 220t-1a and 220t-1b may all be constituted by the second dummy patterns DM2a, DM2b, DM2c, DM2d, and DM2e. The first boundary CLa may be a boundary for separating each of the bridge patterns 222 and the second dummy patterns DM2a, DM2b, DM2c, DM2d, and DM2e. The second boundary CLb may be a boundary for separating the second dummy patterns DM2a, DM2b, DM2c, DM2d, and DM2e and each of the second trace lines 220t-1a and 220t-1b. The third boundary CLc may be a visible cut obtained by removing a portion of the mesh structure to prevent the portion of the mesh structure from being visible to the user due to reflection of external light. The fourth boundary CLd may be a boundary for electrically isolating the second dummy patterns DM2a, DM2b, DM2c, DM2d, and DM2e.

In an embodiment of the present disclosure, the second dummy patterns DM2a, DM2b, DM2c, DM2d, and DM2e may have a size smaller than or equal to a predetermined size since the fourth boundary CLd is additionally provided. Accordingly, the capacitance between each of the second dummy patterns DM2a, DM2b, DM2c, DM2d, and DM2e and the first electrode 210-1 or the second electrode 220-2 may be less than or equal to a predetermined value. Thus, the signal to noise ratio of the sensor layer 200 may be increased so that the sensing sensitivity of the sensor layer 200 may be improved.

Figure 9:
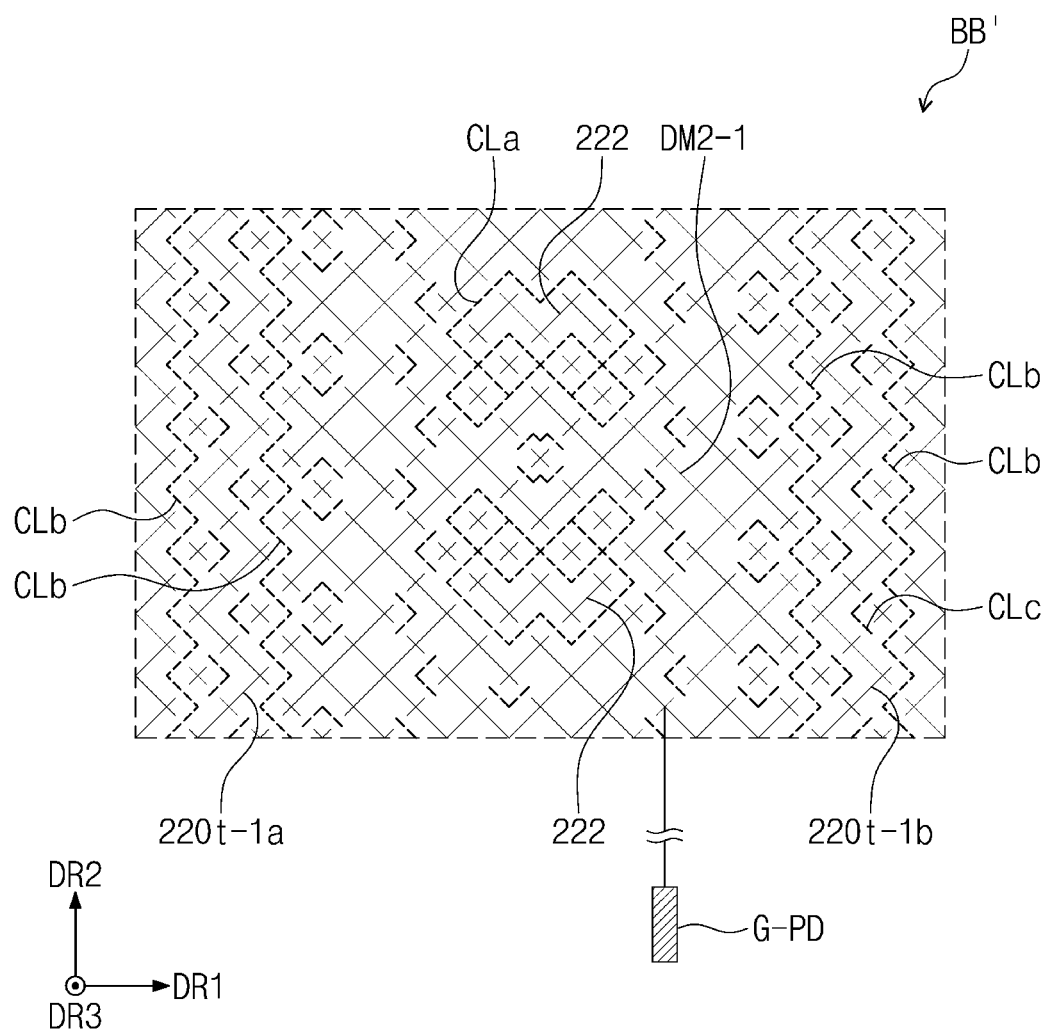
FIG. 9 is an enlarged plan view of region BB' illustrated in FIG. 6 according to an embodiment of the present disclosure.

FIG. 9 is an enlarged plan view of region BB' illustrated in FIG. 6 according to an embodiment of the present disclosure. In describing FIG. 9, the following description will be focused on only the difference from FIG. 8, and identical components will be assigned with identical reference numerals and will be omitted from the description.

Referring to FIGS. 5, 6, and 9, the sensor layer 200 may further include a second dummy pattern DM2-1. The second dummy pattern DM2-1 may be disposed on the same layer as the second trace lines 220*t*-1*a* and 220*t*-1*b* and the bridge patterns 222. The second dummy pattern DM2-1 may be electrically floated or electrically grounded. For example, the electronic device 1000 (refer to FIG. 1) may further include a ground pad G-PD to which a ground voltage is applied, and the second dummy pattern DM2-1 may be electrically connected to the ground pad G-PD.

Figure 10A:
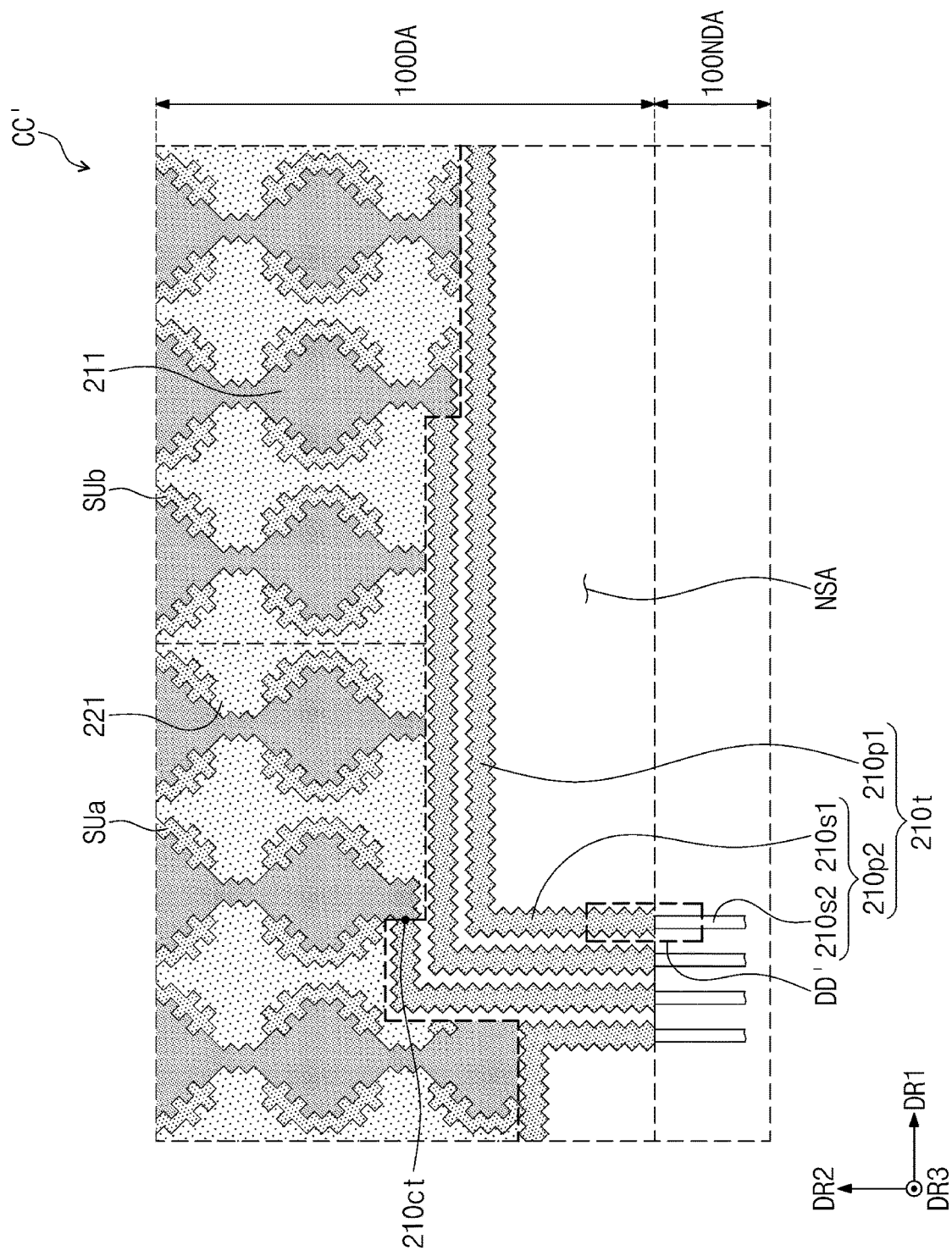
FIG. 10A is a plan view illustrating a portion of the sensor layer corresponding to region CC' illustrated in FIG. 5 according to an embodiment of the present disclosure.
Figure 10B:
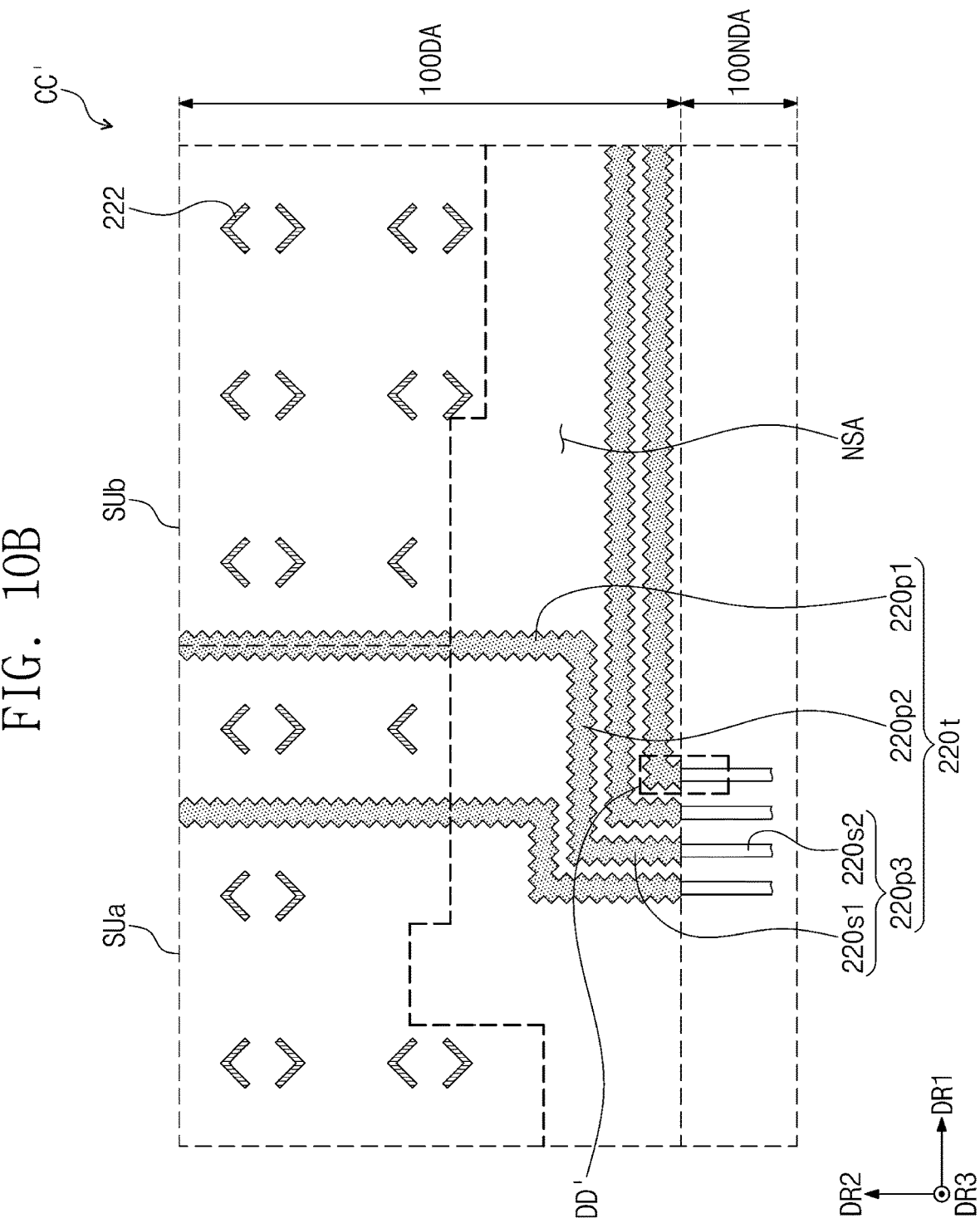
FIG. 10B is a plan view illustrating a portion of the sensor layer corresponding to region CC' illustrated in FIG. 5 according to an embodiment of the present disclosure.

FIG. 10A is a plan view illustrating a portion of the sensor layer corresponding to region CC' illustrated in FIG. 5 according to an embodiment of the present disclosure. FIG. 10B is a plan view illustrating a portion of the sensor layer corresponding to region CC' illustrated in FIG. 5 according to an embodiment of the present disclosure.

Referring to FIGS. 5, 10A, and 10B, two sensing units SUa and SUb are illustrated as an example in FIGS. 10A and 10B. The two sensing units SUa and SUb may be some of the sensing units overlapping the display region 100DA and adjacent to the peripheral region 100NDA among the plurality of sensing units SU.

Referring to FIG. 10A, each of the first trace lines 210*t* may include a first portion 210*p*1 extending parallel to the first direction DR1 and a second portion 210*p*2 extending from the first portion 210*p*1 in parallel with the second direction DR2, and the first portion 210*p*1 may overlap the display region 100DA. The second portion 210*p*2 may include a first sub-portion 210*s*1 overlapping the display region 100DA and a second sub-portion 210*s*2 overlapping the peripheral region 100NDA. A portion where the first portion 210*p*1 and the second portion 210*p*2 meet each other may be referred to as a bent portion of each of the first trace lines 210*t*.

The first portion 210*p*1 may be referred to as a (1-1)th portion or a connecting portion. The second portion 210*p*2 may be referred to as a (1-2)th portion or an extending portion. The second portion 210*p*2 may extend from one end of the first portion 210*p*1 toward the peripheral region 100NDA.

Portions of the first trace lines 210*t* that overlap the display region 100DA may be disposed on the same layer as the sensing portion 211 and the sensing pattern 221. For example, both the first portion 210*p*1 and the first sub-portion 210-*s*1 may be disposed on the same layer as the sensing pattern 221. The first portion 210*p*1 and the first sub-portion 210*s*1 may have a mesh structure that is similar to those of the sensing portion 211 and the sensing pattern 221, and description thereabout will be given below.

In an embodiment of the present disclosure, each of the first trace lines 210*t* may be integrally connected to a corresponding sensing portion 211. Accordingly, each of the first contacts 210*ct* may be referred to as a portion where one first trace line 210*t* makes contact with one first electrode 210. In other words, a first contact 210*ct* may be an area where a first trace line 210*t* and a first electrode 210 meet.

In an embodiment of the present disclosure, each of the first trace lines 210*t* may not overlap the first electrodes 210 and the second electrodes 220. For example, a portion of each of the first trace lines 210*t* may overlap the display region 100DA and may not overlap the first electrodes 210 and the second electrodes 220. Accordingly, the sensing units SUa and SUb may be spaced apart from the peripheral region 100NDA with the first trace lines 210*t* therebetween. Thus, a non-sensing region NSA overlapping the display region 100DA may be formed in the sensor layer 200, and portions of the first trace lines 210*t* and portions of the second trace lines 220*t* to be described below may be disposed in the non-sensing region NSA.

Referring to FIG. 10B, each of the second trace lines 220*t* may include a first portion 220*p*1 extending parallel to the second direction DR2, a second portion 220*p*2 extending from the first portion 220*p*1 in parallel with the first direction DR1, and a third portion 220*p*3 extending from the second portion 220*p*2 in parallel with the second direction DR2. The first portion 220*p*1 and the second portion 220*p*2 may overlap the display region 100DA. The third portion 220*p*3 may include a first sub-portion 220*s*1 overlapping the display region 100DA and a second sub-portion 220*s*2 overlapping the peripheral region 100NDA. A portion where the first portion 220*p*1 and the second portion 220*p*2 meet each other and a portion where the second portion 220*p*2 and the third portion 220*p*3 meet each other may be referred to as bent portions of the second trace lines 220*t*. In this case, the second trace lines 220*t* may include two bent portions.

The first portion 220*p*1 may be referred to as a (2-1)th portion or a contact extending portion. The second portion 220*p*2 may be referred to as a (2-2)th portion or a connecting portion. The third portion 220*p*3 may be referred to as a (2-3)th portion or an extending portion. The first portion 220*p*1 may extend from one end of the second portion 220*p*2 in a direction away from the peripheral region 100NDA, and the third portion 220*p*3 may extend from an opposite end of the second portion 220*p*2 toward the peripheral region 100NDA. For example, the first portion 220*p*1 may be connected to a first end of the second portion 220*p*2 and the third portion 220*p*3 may be connected to a second end of the second portion 220*p*2.

Portions of the second trace lines 220*t* that overlap the display region 100DA may be disposed on the same layer as the bridge patterns 222. For example, the first portion 220*p*1, the second portion 220*p*2, and the first sub-portion 220*s*1 may be disposed on the same layer as the bridge patterns 222. The first portion 220*p*1, the second portion 220*p*2, and the first sub-portion 220*s*1 may have a mesh structure that is similar to those of the bridge patterns 222.

Each of the second trace lines 220*t*-1*a* and 220*t*-1*b* illustrated in FIG. 6 may correspond to the first portion 220*p*1. The first portion 220*p*1 may not overlap the first electrodes 210. Accordingly, an influence of signal interference or parasitic capacitance between the first electrodes 210 and the first portion 220*p*1 may be minimized.

Referring to FIGS. 10A and 10B, the portions where the directions of the first trace lines 210*t* and the second trace lines 220*t* are changed may all overlap the display region 100DA. For example, the bent portions of the first trace lines 210*t* and the second trace lines 220*t* may overlap the display region 100DA. Accordingly, all of the portions of the first trace lines 210*t* and the second trace lines 220*t* that overlap the peripheral region 100NDA may include a straight line extending in the second direction DR2. In other words, the second sub-portions 210*s*2 of the first trace lines 210*t* and the second sub-portions 220*s*2 of the second trace lines 220*t* may all be straight lines extending in the second direction DR2.

Figure 11:
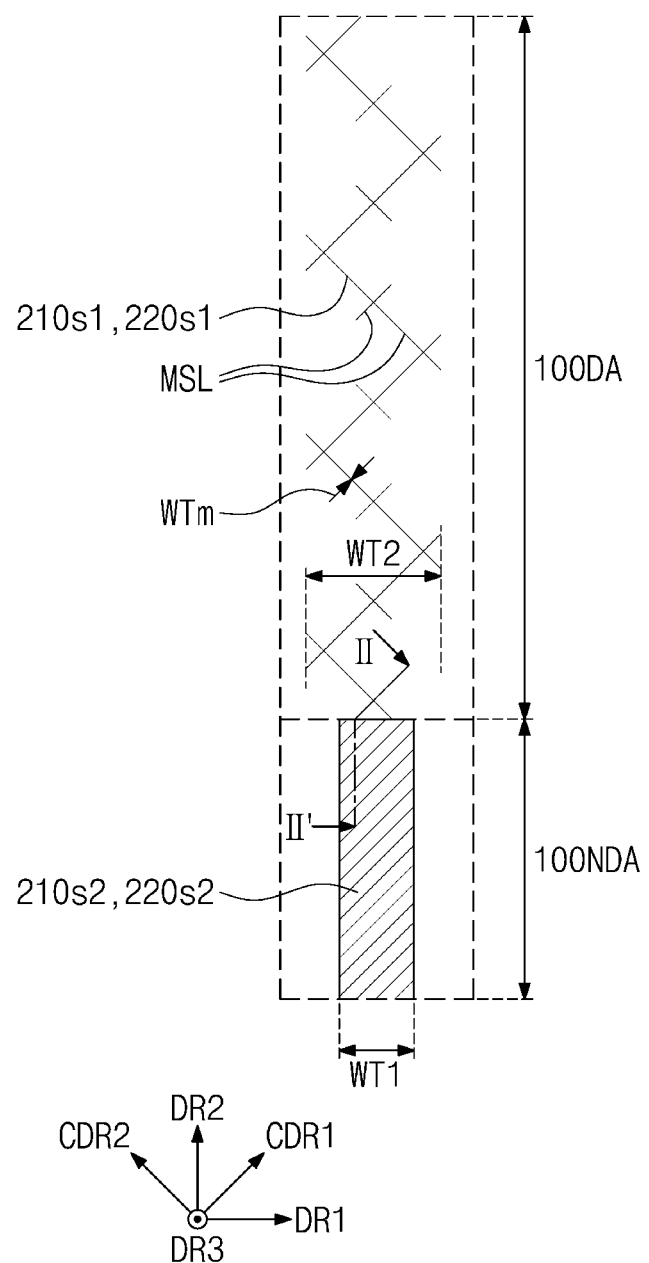
FIG. 11 is a plan view illustrating a portion of the sensor layer corresponding to region DD' illustrated in each of FIGS. 10A and 10B according to an embodiment of the present disclosure.

FIG. 11 is a plan view illustrating a portion of the sensor layer corresponding to region DD' illustrated in each of FIGS. 10A and 10B according to an embodiment of the present disclosure.

Referring to FIGS. 10A, 10B, and 11, the first sub-portion 210*s*1 or 220*s*1 overlapping the display region 100DA and the second sub-portion 210*s*2 or 220*s*2 overlapping the peripheral region 100NDA are illustrated. Hereinafter, the first sub-portion 210*s*1 and the second sub-portion 210*s*2 will be representatively described, and descriptions of the first sub-portion 220s1 and the second sub-portion 220s2 will be omitted.

The shape of the second sub-portion 210s2 may differ from the shapes of the first portion 210p1 and the first sub-portion 210s1.

Each of the first portion 210p1 and the first sub-portion 210s1 may be a portion of a mesh structure. For example, each of the first portion 210p1 and the first sub-portion 210s1 may include mesh lines MSL extending in a first crossing direction CDR1 and a second crossing direction CDR2. The first crossing direction CDR1 may be a direction between the first direction DR1 and the second direction DR2, and the second crossing direction CDR2 may be a direction crossing the first crossing direction CDR1. However, without being particularly limited thereto, each of the first portion 210p1 and the first sub-portion 210s1 may include mesh lines extending in the first direction DR1 and the second direction DR2.

The second sub-portion 210s2 may be a bar-type electrode having a predetermined width WT1 and extending in the second direction DR2.

The width WT1 of the second sub-portion 210s2 may differ from the width WT2 of the first sub-portion 210s1. For example, in the first direction DR1, the first sub-portion 210s1 extending in the second direction DR2 may have the maximum width WT2 greater than the width WT1 of the second sub-portion 210s2 in the first direction DR1. Furthermore, the width WTm of the mesh lines MSL of the second sub-portion 210s2 may be smaller than the width WT1 of the second sub-portion 210s2. However, this is merely illustrative, and the maximum width WT2 of the first sub-portion 210s1 in the first direction DR1 may be smaller than or equal to the width WT1 of the second sub-portion 210s2.

Figure 12A:
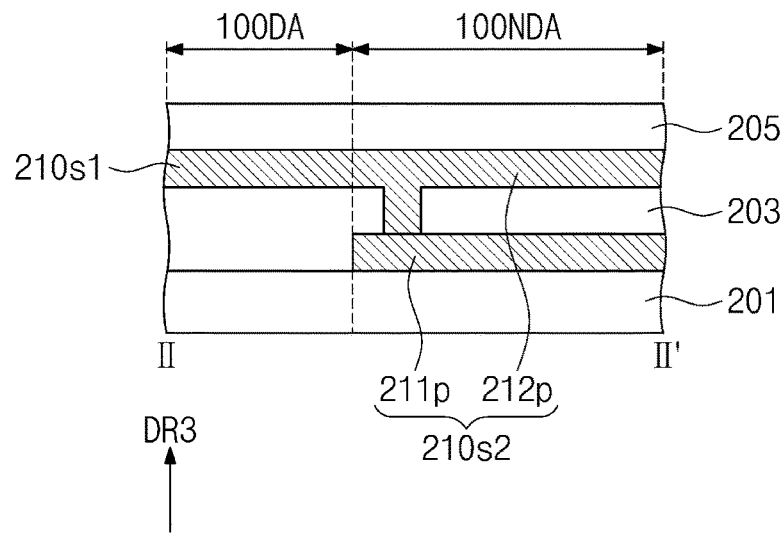
FIG. 12A is a sectional view taken along line II-II' illustrated in FIG. 11 according to an embodiment of the present disclosure.
Figure 12B:
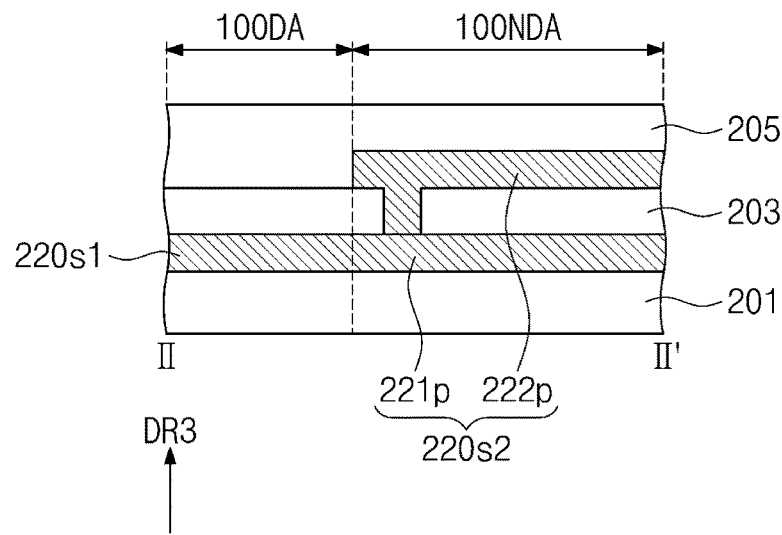
FIG. 12B is a sectional view taken along line II-II' illustrated in FIG. 11 according to an embodiment of the present disclosure.

FIG. 12A is a sectional view taken along line II-II' illustrated in FIG. 11 according to an embodiment of the present disclosure. FIG. 12B is a sectional view taken along line II-II' illustrated in FIG. 11 according to an embodiment of the present disclosure.

Referring to FIGS. 5, 11, and 12A, the second sub-portion 210s2 may have a multi-layer structure. For example, the second sub-portion 210s2 may include a first sub-conductive layer 211p and a second sub-conductive layer 212p disposed on a layer different from the first sub-conductive layer 211p. The first sub-conductive layer 211p and the second sub-conductive layer 212p may be electrically connected with each other. For example, the first sub-conductive layer 211p and the second sub-conductive layer 212p may contact each other through an opening in the sensor insulating layer 203. Since a portion of the first trace line 210t has a multi-layer structure, the resistance of the first trace line 210t may be decreased. However, the present disclosure is not limited thereto, and the second sub-portion 210s2 may include only the first sub-conductive layer 211p, or may include only the second sub-conductive layer 212p.

Referring to FIGS. 5, 11, and 12B, the second sub-portion 220s2 may have a multi-layer structure. For example, the second sub-portion 220s2 may include a first sub-conductive layer 221p and a second sub-conductive layer 222p disposed on a layer different from the first sub-conductive layer 221p. The first sub-conductive layer 221p and the second sub-conductive layer 222p may be electrically connected with each other. Since a portion of the second trace line 220t has a multi-layer structure, the resistance of the second trace line 220t may be decreased. However, the present disclosure is not limited thereto, and the second sub-portion 220s2 may include only the first sub-conductive layer 221p, or may include only the second sub-conductive layer 222p.

The first sub-conductive layer 211p and the first sub-conductive layer 221p may be disposed between the sensor base layer 201 and the sensor insulating layer 203, and the second sub-conductive layer 212p and the second sub-conductive layer 222p may be disposed between the sensor insulating layer 203 and the sensor cover layer 205. In other words, the first sub-conductive layer 211p and the first sub-conductive layer 221p may be included in the first sensor conductive layer 202 (refer to FIG. 3), and the second sub-conductive layer 212p and the second sub-conductive layer 222p may be included in the second sensor conductive layer 204 (refer to FIG. 3).

In an embodiment of the present disclosure, when the sensor layer 200 has a bottom bridge structure, the first sub-conductive layer 211p and the first sub-conductive layer 221p may be disposed on the same layer as the first sub-portion 220s1 of the second trace line 220t, and the second sub-conductive layer 212p and the second sub-conductive layer 222p may be disposed on the same layer as the first sub-portion 210s1 of the first trace line 210t.

When the sensor layer 200 has a top bridge structure, the first sub-conductive layer 211p and the first sub-conductive layer 221p may be disposed on the same layer as the first sub-portion 210s1 of the first trace line 210t, and the second sub-conductive layer 212p and the second sub-conductive layer 222p may be disposed on the same layer as the first sub-portion 220s1 of the second trace line 220t.

Figure 13:
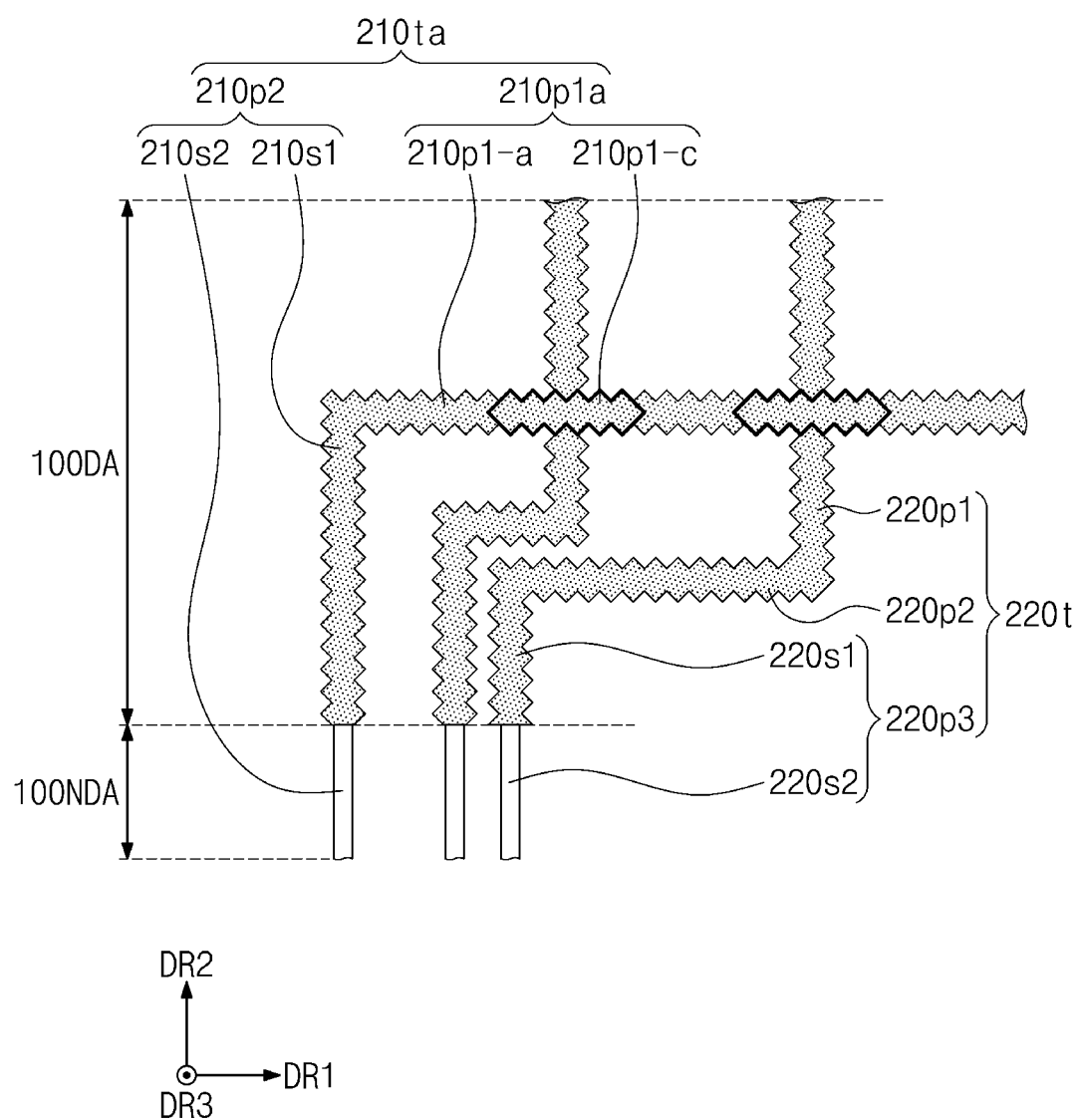
FIG. 13 is a plan view illustrating some components of the sensor layer according to an embodiment of the present disclosure.

FIG. 13 is a plan view illustrating some components of the sensor layer 200 according to an embodiment of the present disclosure.

Referring to FIG. 13, portions of two first trace lines 210ta and portions of two second trace lines 220t are illustrated as an example.

Each of the first trace lines 210ta may include a first portion 210p1a extending parallel to the first direction DR1 and a second portion 210p2 extending from the first portion 210p1a in parallel with the second direction DR2, and the first portion 210p1a may overlap the display region 100DA. The second portion 210p2 may include a first sub-portion 210s1 overlapping the display region 100DA and a second sub-portion 210s2 overlapping the peripheral region 100NDA.

In an embodiment of the present disclosure, the first portion 210p1a may include a first layer portion 210p1-a and a second layer portion 210p1-c disposed on a layer different from the first layer portion 210p1-a. The first layer portion 210p1-a may be disposed on the same layer as the second trace lines 220t. The second layer portion 210p1-c may be insulated from at least one second trace line 220t among the second trace lines 220t and may cross the at least one second trace line 220t.

In an embodiment of the present disclosure, the portions of the first trace line 210ta that overlap the display region 100DA may all be disposed on the same layer, and a second portion 220p2 of each of the second trace lines 220t may include a first layer portion and a second layer portion disposed on a layer different from the first layer portion. The first layer portion may be disposed on the same layer as the first trace line 210ta. In this case, the second layer portion of the second trace line 220t may be insulated from the first trace line 210ta and may cross the first trace line 210ta.

Figure 14A:
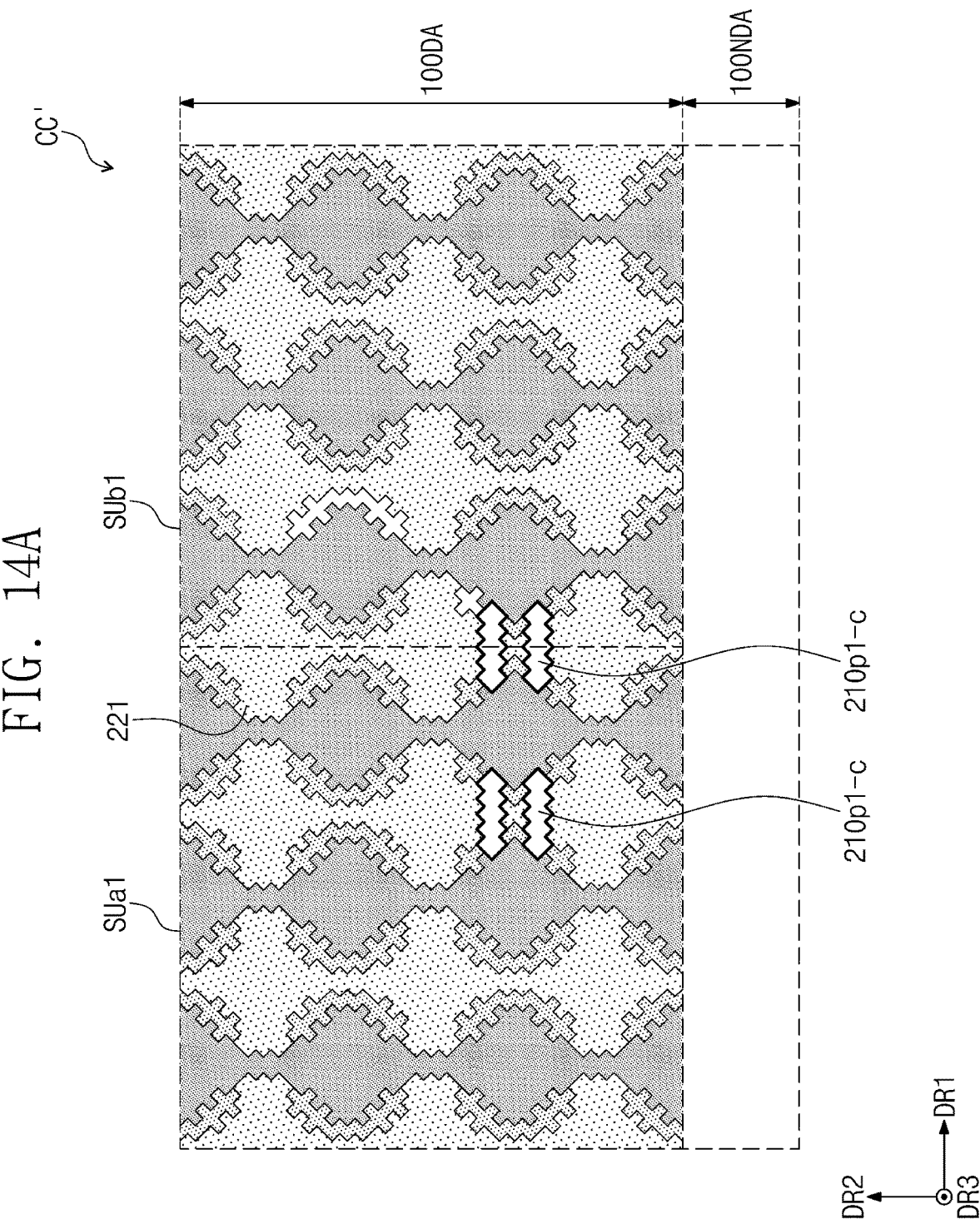
FIG. 14A is a plan view illustrating a portion of the sensor layer corresponding to region CC' illustrated in FIG. 5 according to an embodiment of the present disclosure.
Figure 14B:
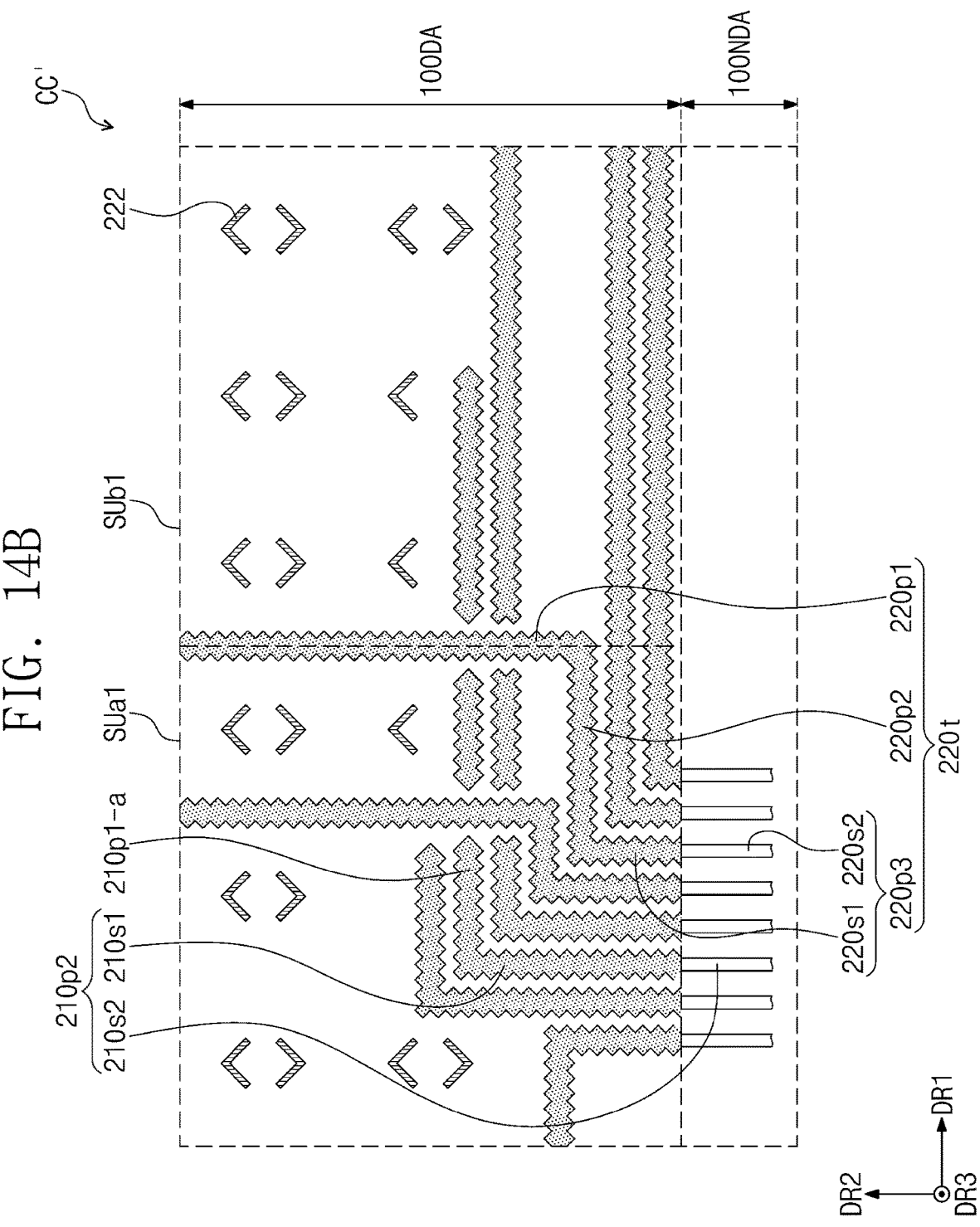
FIG. 14B is a plan view illustrating a portion of the sensor layer corresponding to region CC' illustrated in FIG. 5 according to an embodiment of the present disclosure.

FIG. 14A is a plan view illustrating a portion of the sensor layer corresponding to region CC' illustrated in FIG. 5 according to an embodiment of the present disclosure. FIG. 14B is a plan view illustrating a portion of the sensor layer corresponding to region CC' illustrated in FIG. 5 according to an embodiment of the present disclosure.

Referring to FIGS. 5, 13, 14A, and 14B, two sensing units SUa1 and SUb1 are illustrated as an example. The two sensing units SUa1 and SUb1 may be some of the sensing units overlapping the display region 100DA and adjacent to the peripheral region 100NDA among the plurality of sensing units SU.

A first layer portion 210p1-a may be disposed on the same layer as the bridge patterns 222, and a second layer portion 210p1-c may be disposed on the same layer as the sensing patterns 221.

In an embodiment of the present disclosure, portions of the first trace lines 210ta may overlap the first electrodes 210 and the second electrodes 220. For example, a portion of each of the first trace lines 210ta may overlap the display region 100DA and may overlap the first electrodes 210 and the second electrodes 220. Accordingly, the areas of the sensing units SUa1 and SUb1 may be larger the areas of the sensing units SUa and SUb illustrated in FIGS. 10A and 10B. In addition, the distance between the sensing units SUa1 and SUb1 and the peripheral region 100NDA may be smaller than the distance between the sensing units SUa and SUb illustrated in FIGS. 10A and 10B and the peripheral region 100NDA.

As described above, the sensor layer includes the plurality of first electrodes, the plurality of second electrodes, the plurality of first trace lines, and the plurality of second trace lines. The bent portions of the first trace lines and the bent portions of the second trace lines may overlap the display region. Accordingly, the area of the peripheral region may be reduced. Thus, the area occupied by the peripheral region on the display surface of the electronic device may be reduced, and a narrow bezel may be implemented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a display layer including a display region in which an image is displayed and a peripheral region adjacent to the display region; and
a sensor layer disposed on the display layer,
wherein the sensor layer includes:
a plurality of first electrodes arranged in a first direction;
a plurality of second electrodes arranged in a second direction crossing the first direction and crossing the plurality of first electrodes;
a plurality of first trace lines electrically connected with the plurality of first electrodes, respectively; and
a plurality of second trace lines electrically connected with the plurality of second electrodes, respectively,
wherein the plurality of first electrodes and the plurality of first trace lines are connected through a plurality of first contacts, respectively, and the plurality of second electrodes and the plurality of second trace lines are connected through a plurality of second contacts, respectively, and
wherein the plurality of first contacts and the plurality of second contacts overlap the display region.

2. The electronic device of claim 1, wherein each of the plurality of first trace lines includes a first portion extending parallel to the first direction and a second portion extending from the first portion in parallel with the second direction, and the first portion overlaps the display region.

3. The electronic device of claim 2, wherein the second portion includes a first sub-portion overlapping the display region and a second sub-portion overlapping the peripheral region.

4. The electronic device of claim 3, wherein the second sub-portion includes a first sub-conductive layer disposed on the same layer as the first sub-portion and a second sub-conductive layer disposed on a layer different from the first sub-conductive layer and electrically connected with the first sub-conductive layer.

5. The electronic device of claim 3, wherein the second sub-portion has a shape different from shapes of the first portion and the first sub-portion.

6. The electronic device of claim 3, wherein the second sub-portion has a width different from a width of the first sub-portion.

7. The electronic device of claim 2, wherein the plurality of first electrodes or the plurality of second electrodes include a plurality of sensing patterns and a plurality of bridge patterns disposed on a layer different from the plurality of sensing patterns and electrically connected to the plurality of sensing patterns.

8. The electronic device of claim 7, wherein all of the first portion is disposed on the same layer as the plurality of sensing patterns.

9. The electronic device of claim 7, wherein the first portion includes a first layer portion disposed on the same layer as the plurality of bridge patterns and a second layer portion disposed on the same layer as the plurality of sensing patterns.

10. The electronic device of claim 9, wherein the second layer portion crosses at least one second trace line among the plurality of second trace lines.

11. The electronic device of claim 1, wherein each of the plurality of second trace lines includes a first portion extending parallel to the second direction, a second portion extending from the first portion in parallel with the first direction, and a third portion extending from the second portion in parallel with the second direction, and the first portion and the second portion overlap the display region.

12. The electronic device of claim 11, wherein the plurality of first electrodes or the plurality of second electrodes include a plurality of sensing patterns and a plurality of bridge patterns disposed on a layer different from the plurality of sensing patterns and electrically connected to the plurality of sensing patterns, and the first portion and the second portion are disposed on the same layer as the plurality of bridge patterns.

13. The electronic device of claim 11, wherein the first portion does not overlap the plurality of first electrodes.

14. The electronic device of claim 1, wherein portions of the plurality of first trace lines and the plurality of second trace lines that overlap the peripheral region include a straight line extending in the second direction.

15. The electronic device of claim 1, wherein the sensor layer further includes a plurality of dummy patterns disposed on the same layer as the plurality of second trace lines in an area overlapping the display region.

16. The electronic device of claim 15, wherein the plurality of dummy patterns are electrically floated or electrically grounded.

17. The electronic device of claim 1, wherein portions of the plurality of first trace lines overlap the display region and do not overlap the plurality of first electrodes and the plurality of second electrodes.

18. The electronic device of claim 1, wherein portions of the plurality of first trace lines overlap the display region and overlap at least some of the plurality of first electrodes and the plurality of second electrodes.

19. An electronic device comprising:
a display layer including a display region configured to display an image and a peripheral region adjacent to the display region; and
a sensor layer disposed on the display layer,
wherein the sensor layer includes:
a first electrode;
a second electrode configured to cross the first electrode;
a first trace line electrically connected with the first electrode; and
a second trace line electrically connected with the second electrode,
wherein the first trace line includes a (1-1)th portion extending parallel to a first direction and a (1-2)th portion extending from the (1-1)th portion in parallel with a second direction crossing the first direction,
wherein the second trace line includes a (2-1)th portion extending parallel to the second direction, a (2-2)th portion extending from the (2-1)th portion in parallel with the first direction, and a (2-3)th portion extending from the (2-2)th portion in parallel with the second direction, and
wherein the (1-1)th portion, a portion of the (1-2)th portion, the (2-1)th portion, the (2-2)th portion, and a portion of the (2-3)th portion overlap the display region.

20. The electronic device of claim 19, wherein the sensor layer further includes a plurality of dummy patterns disposed on the same layer as the (2-1)th portion, and the plurality of dummy patterns are electrically floated or electrically grounded.

21. The electronic device of claim 19, wherein each of the (1-2)th portion and the (2-3)th portion includes a first sub-portion overlapping the display region and a second sub-portion overlapping the peripheral region, and the first sub-portion and the second sub-portion have different shapes.

22. The electronic device of claim 19, wherein an entirety of the (1-1)th portion is disposed on a layer different from the (2-1)th portion.

23. The electronic device of claim 19, wherein the (1-1)th portion includes a first layer portion disposed on the same layer as the (2-1)th portion and a second layer portion disposed on a layer different from the (2-1)th portion, and the second layer portion overlaps the (2-1)th portion.

24. An electronic device comprising:
a display layer including a display region and a peripheral region adjacent to the display region; and
a sensor layer disposed on the display layer,
wherein the sensor layer includes:
a plurality of first electrodes arranged in a first direction;
a plurality of second electrodes arranged in a second direction crossing the first direction;
a plurality of first trace lines electrically connected with the plurality of first electrodes, respectively, in the display region; and
a plurality of second trace lines electrically connected with the plurality of second electrodes, respectively, in the display region, and
wherein a connecting portion of each of the plurality of first trace lines and the plurality of second trace lines extends in the first direction and overlaps the display region.

25. The electronic device of claim 24, wherein each of the plurality of first trace lines and the plurality of second trace lines further includes an extending portion extending from the connecting portion toward the peripheral region, and
wherein each of the plurality of second trace lines further includes a contact extending portion extending from the connecting portion in a direction away from the peripheral region.

26. The electronic device of claim 25, wherein the sensor layer further includes a plurality of dummy patterns disposed on the same layer as the contact extending portion, and the plurality of dummy patterns are electrically floated or electrically grounded.

27. The electronic device of claim 24, wherein the connecting portion of each of the plurality of first trace lines does not overlap the plurality of first electrodes and the plurality of second electrodes.

* * * * *